(12) United States Patent
Jindal

(10) Patent No.: US 11,294,556 B1
(45) Date of Patent: Apr. 5, 2022

(54) EDITING DIGITAL IMAGES USING MULTI-PANEL GRAPHICAL USER INTERFACES

(71) Applicant: Adobe Inc., San Jose, CA (US)

(72) Inventor: Amol Jindal, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/141,745

(22) Filed: Jan. 5, 2021

(51) Int. Cl.
| | |
|---|---|
| *G06F 3/0484* | (2013.01) |
| *G06F 3/04845* | (2022.01) |
| *G06F 3/0485* | (2022.01) |
| *G06F 3/0482* | (2013.01) |
| *G06F 3/04817* | (2022.01) |

(52) U.S. Cl.
CPC ........ *G06F 3/04845* (2013.01); *G06F 3/0482* (2013.01); *G06F 3/0485* (2013.01); *G06F 3/04817* (2013.01); *G06F 2203/04803* (2013.01); *G06F 2203/04806* (2013.01)

(58) Field of Classification Search
CPC .. G06F 3/04845; G06F 3/0482; G06F 3/0485; G06F 3/04817; G06F 2203/04803; G06F 2203/04806; G06F 3/04843; G06F 3/04806; G06F 3/048; G06F 3/0484; G06F 3/0481
See application file for complete search history.

(56) References Cited

U.S. PATENT DOCUMENTS

| | | | | |
|---|---|---|---|---|
| 5,060,171 A | * | 10/1991 | Steir | G06T 19/006 345/630 |
| 5,263,095 A | * | 11/1993 | Kitamura | G06T 5/005 345/22 |
| 5,442,739 A | * | 8/1995 | Saito | G06T 11/60 345/676 |
| 5,784,498 A | * | 7/1998 | Venable | G06T 11/001 358/448 |
| 5,917,989 A | * | 6/1999 | DuCatte, Jr. | G11B 27/034 386/282 |
| 6,081,611 A | * | 6/2000 | Linford | G06T 11/203 382/128 |
| 6,229,544 B1 | * | 5/2001 | Cragun | G06T 11/00 345/418 |

(Continued)

OTHER PUBLICATIONS

Sawh (http://web.archive.org/web/20170713052543/https://www.slrlounge.com/photoshop-tips-split-sceen-dual-window-efficiency; pub date:Jan. 5, 2016; downloaded Apr. 10, 2021) (Year: 2016).*

(Continued)

*Primary Examiner* — Jung-Mu T Chuang
(74) *Attorney, Agent, or Firm* — Keller Preece PLLC

(57) ABSTRACT

The present disclosure relates to systems, methods, and non-transitory computer-readable media that utilize a multi-panel graphical user interface for modifying digital images. For example, in one or more embodiments, the disclosed systems divide the graphical user interface of a client device into first panel and a second panel. Further, the disclosed systems provide different portions of a digital image for display within the first and second panels. In some implementations, the disclosed systems receive a user interaction with the portion of the digital image displayed within the first panel. Based on the received user interaction, the disclosed systems modify the second portion of the digital image displayed within the second panel.

20 Claims, 9 Drawing Sheets

(56) References Cited

U.S. PATENT DOCUMENTS

| | | | | |
|---|---|---|---|---|
| 6,985,263 B2* | 1/2006 | Georgiev | ............... | G06K 9/40 358/3.26 |
| 7,151,547 B2* | 12/2006 | Lin | ............... | G06T 11/60 345/627 |
| 7,199,793 B2* | 4/2007 | Oh | ............... | G06T 15/205 345/419 |
| 7,260,273 B2* | 8/2007 | Sellers | ............... | G06T 11/001 345/582 |
| 7,317,826 B2* | 1/2008 | Wilensky | ............... | G06K 9/342 382/162 |
| 7,327,374 B2* | 2/2008 | Oh | ............... | G06T 11/60 345/611 |
| 7,496,238 B2* | 2/2009 | Hong | ............... | H04N 1/622 348/222.1 |
| 7,519,907 B2* | 4/2009 | Cohen | ............... | G06T 11/60 715/723 |
| 7,974,485 B1* | 7/2011 | Azar | ............... | H04N 21/4854 382/254 |
| 8,174,538 B2* | 5/2012 | Oh | ............... | G06T 11/60 345/611 |
| 8,233,725 B2* | 7/2012 | Zaklika | ............... | G06T 5/00 382/224 |
| 8,270,765 B1* | 9/2012 | Avidan | ............... | G06T 3/0012 382/284 |
| 8,380,005 B1* | 2/2013 | Jonsson | ............... | G06T 11/60 382/282 |
| 8,385,681 B2* | 2/2013 | Weiss | ............... | G06K 9/033 382/275 |
| 8,704,778 B2* | 4/2014 | Miyashita | ............... | G06F 3/04883 345/173 |
| 8,743,139 B2* | 6/2014 | Pettigrew | ............... | G06T 11/001 345/594 |
| 8,811,749 B1* | 8/2014 | Barnes | ............... | G06T 7/337 382/195 |
| 8,861,869 B2* | 10/2014 | Shechtman | ............... | G06K 9/6211 382/218 |
| 8,891,864 B2* | 11/2014 | Pettigrew | ............... | G06T 5/002 382/167 |
| 8,963,960 B2* | 2/2015 | Gilra | ............... | G09G 5/00 345/660 |
| 9,058,699 B2* | 6/2015 | Jonsson | ............... | G06T 11/60 |
| 9,135,732 B2* | 9/2015 | Winn | ............... | G06T 11/60 |
| 9,208,548 B1* | 12/2015 | Noble | ............... | G06F 16/5866 |
| 9,228,839 B2* | 1/2016 | Chen | ............... | G01C 21/3664 |
| 9,323,446 B2* | 4/2016 | Seo | ............... | G06F 3/04886 |
| 9,380,286 B2* | 6/2016 | Cohen | ............... | H04N 13/111 |
| 9,478,255 B1* | 10/2016 | Gregg | ............... | H04N 9/80 |
| 9,569,697 B1* | 2/2017 | McNerney | ............... | G06K 9/6267 |
| 9,837,128 B2* | 12/2017 | Amura | ............... | G11B 27/34 |
| 9,857,970 B2* | 1/2018 | Hinckley | ............... | G06F 3/04845 |
| 9,891,817 B2* | 2/2018 | Andersson | ............... | G06F 3/04886 |
| 10,510,186 B2* | 12/2019 | Batra | ............... | G06F 3/048 |
| 10,834,310 B2* | 11/2020 | Baldwin | ............... | H04N 5/23232 |
| 2003/0210828 A1* | 11/2003 | Georgiev | ............... | G06T 5/20 382/254 |
| 2004/0042662 A1* | 3/2004 | Wilensky | ............... | G06K 9/342 382/194 |
| 2004/0091237 A1* | 5/2004 | Hong | ............... | H04N 1/622 386/260 |
| 2004/0095357 A1* | 5/2004 | Oh | ............... | G06T 15/205 345/589 |
| 2004/0217975 A1* | 11/2004 | Oh | ............... | G06T 11/60 345/612 |
| 2005/0031225 A1* | 2/2005 | Sellers | ............... | G06T 11/001 382/275 |
| 2006/0109282 A1* | 5/2006 | Lin | ............... | G06T 11/60 345/620 |
| 2006/0176311 A1* | 8/2006 | Kimoto | ............... | H04N 9/3182 345/589 |
| 2007/0013813 A1* | 1/2007 | Sun | ............... | G06T 7/12 348/587 |
| 2007/0165966 A1* | 7/2007 | Weiss | ............... | H04N 5/272 382/284 |
| 2007/0222769 A1* | 9/2007 | Otsuka | ............... | G01C 21/3664 345/173 |
| 2009/0043913 A1* | 2/2009 | Shelton | ............... | G06F 3/04845 709/242 |
| 2009/0096808 A1* | 4/2009 | Winn | ............... | G06T 11/60 345/594 |
| 2009/0202170 A1* | 8/2009 | Weiss | ............... | G06K 9/4652 382/275 |
| 2009/0249243 A1* | 10/2009 | Bisalputra | ............... | G06F 3/048 715/781 |
| 2010/0073403 A1* | 3/2010 | Oh | ............... | G06T 11/60 345/629 |
| 2010/0097338 A1* | 4/2010 | Miyashita | ............... | G06F 3/04883 345/173 |
| 2010/0194781 A1* | 8/2010 | Tossing | ............... | G06Q 10/103 345/620 |
| 2012/0020553 A1* | 1/2012 | Pettigrew | ............... | G06T 11/001 382/164 |
| 2012/0210274 A1* | 8/2012 | Pettigrew | ............... | G06T 5/002 715/810 |
| 2013/0127889 A1* | 5/2013 | Winnemoeller | ............... | G06T 11/001 345/582 |
| 2013/0127915 A1* | 5/2013 | Gilra | ............... | G06T 3/0012 345/660 |
| 2013/0148860 A1* | 6/2013 | Musatenko | ............... | G06K 9/6206 382/107 |
| 2013/0218464 A1* | 8/2013 | Chen | ............... | G06F 3/04883 701/533 |
| 2013/0236091 A1* | 9/2013 | Ubillos | ............... | H04N 9/70 382/163 |
| 2013/0342483 A1* | 12/2013 | Seo | ............... | G06F 3/04886 345/173 |
| 2014/0035950 A1* | 2/2014 | Jonsson | ............... | G06T 11/60 345/629 |
| 2014/0068499 A1* | 3/2014 | Yoo | ............... | G06F 3/0488 715/781 |
| 2014/0105499 A1* | 4/2014 | Shechtman | ............... | G06T 7/337 382/180 |
| 2015/0185585 A1* | 7/2015 | Kawai | ............... | H04N 9/04515 348/333.11 |
| 2015/0301732 A1* | 10/2015 | Henderson | ............... | G06F 3/04847 715/769 |
| 2017/0140797 A1* | 5/2017 | Amura | ............... | G11B 27/34 |
| 2019/0058862 A1* | 2/2019 | Kim | ............... | G06F 3/1446 |
| 2019/0197771 A1* | 6/2019 | Batra | ............... | G06F 3/04883 |
| 2019/0336101 A1* | 11/2019 | Chiang | ............... | G01S 7/52079 |
| 2020/0098091 A1* | 3/2020 | Peterson | ............... | G06T 11/60 |
| 2021/0015456 A1* | 1/2021 | Chiang | ............... | G01S 7/52066 |

OTHER PUBLICATIONS

Shirley et al. ("Fundamentals of Computer Graphics Third Edition"; pub date: 2009) (Year: 2009).*

Pakarklis, Emil; iPhone Photography School; "Complete Guide to Using Snapseed to Edit Your iPhone Photos"; Date downloaded Jan. 12, 2021; https://iphonephotographyschool.com/snapseed/.

PicsArt Blog; "How to Use PicsArt's Clone Tool"; Jul. 16, 2015 https://picsart.com/blog/post/how-to-use-picsarts-clone-tool/.

Gayle Vehar; "6 Tips for Cloning in Lightroom"; Oct. 11, 2018 https://www.lightroompresets.com/blogs/pretty-presets-blog/79936260-6-tips-for-cloning-in-lightroom.

* cited by examiner

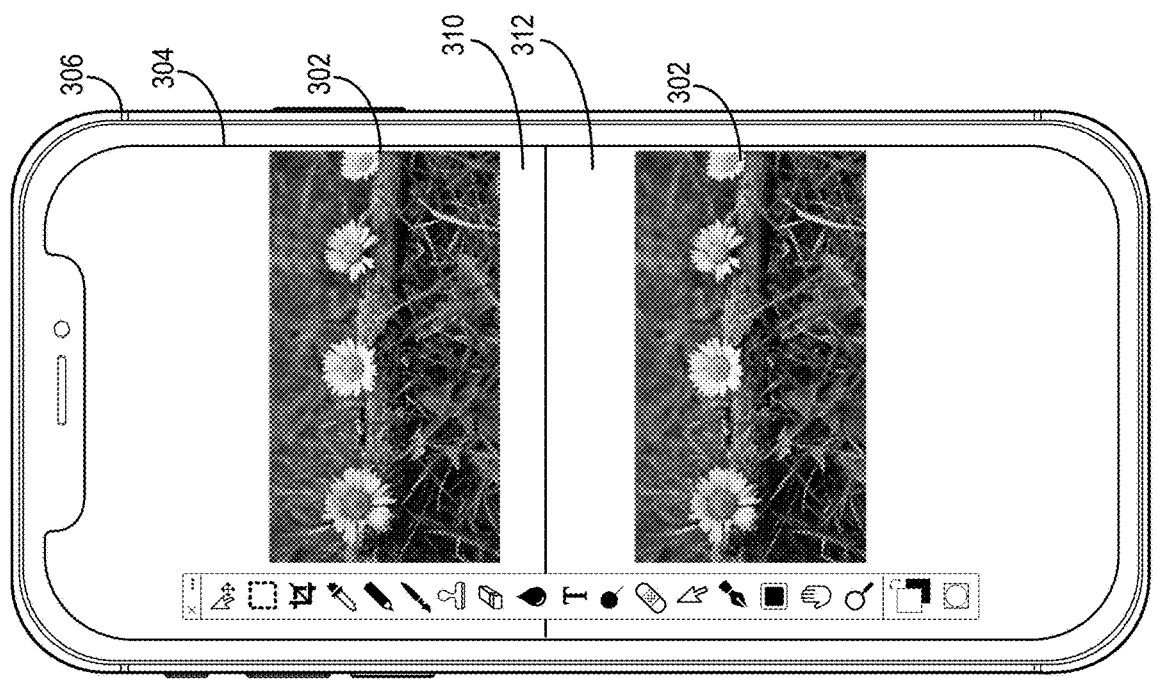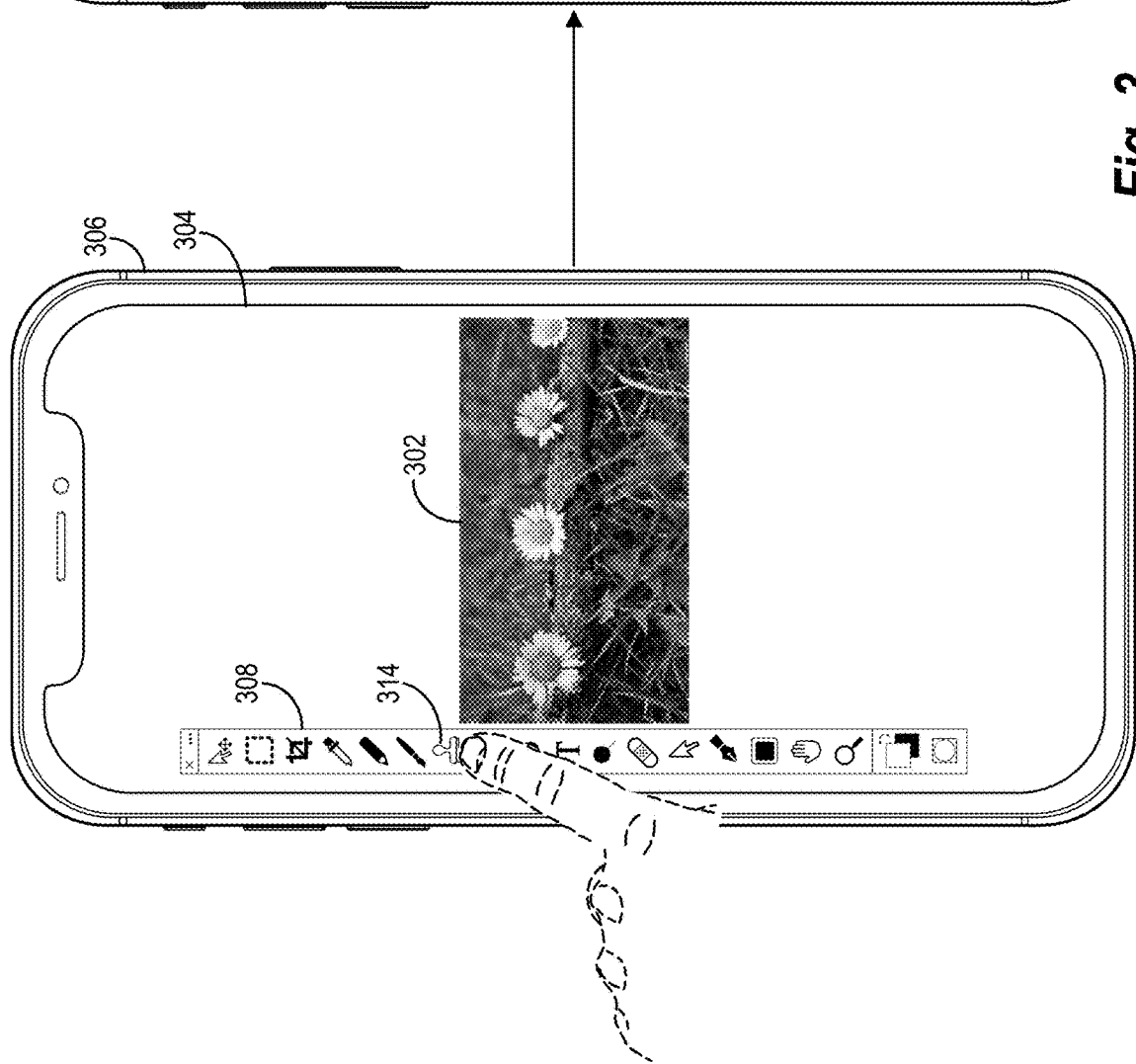
Fig. 3

EDITING DIGITAL IMAGES USING MULTI-PANEL GRAPHICAL USER INTERFACES

BACKGROUND

Recent years have seen a significant advancement in hardware and software platforms that perform various tasks for editing digital images. For example, many conventional systems provide various tools that can be implemented for modifying a digital image, such as by cropping the digital image or copying one set of pixels of the digital image onto another set of pixels of the digital image. More recent advancements have even enabled deployment of such conventional systems on mobile computing devices, such as laptops, tablets, or smartphones. Indeed, individuals and businesses increasingly utilize laptops, tablets, smartphones, handheld devices, and other mobile technology for a variety of tasks involving digital images. For example, individuals and businesses increasingly utilize smartphones to capture, view, and modify digital images, such as portrait images or "selfies." Although conventional image editing systems enable the modification of digital images, even on smartphones, such systems often require edits to be made in inflexible formats that result in imprecise modifications to the digital images.

SUMMARY

One or more embodiments described herein provide benefits and/or solve one or more problems in the art with systems, methods, and non-transitory computer-readable media that provide a multi-panel graphical user interface for flexibly and precisely editing digital images. For example, in one or more embodiments, a system splits the screen used for editing a digital image on a client device into two separate panels. In some implementations, the system utilizes one panel of the split screen to provide a view of the digital image that is distinct from the view of the digital image provided via the other panel. For example, in some instances, the system pans, rotates, and/or zooms the view provided in one panel differently than the view provided in the other panel. In some embodiments, the system modifies the digital image based on a user interaction with a portion of the digital image displayed in one panel and provides the modification for display in the other panel. In this manner, the system provides for more flexible and precise digital image editing, particularly when deployed on mobile computing devices (e.g., smartphones) with relatively small form factors.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3 illustrates a user interface dividing a graphical user interface into multiple panels in accordance with one or more embodiments;

DETAILED DESCRIPTION

Figure 1:
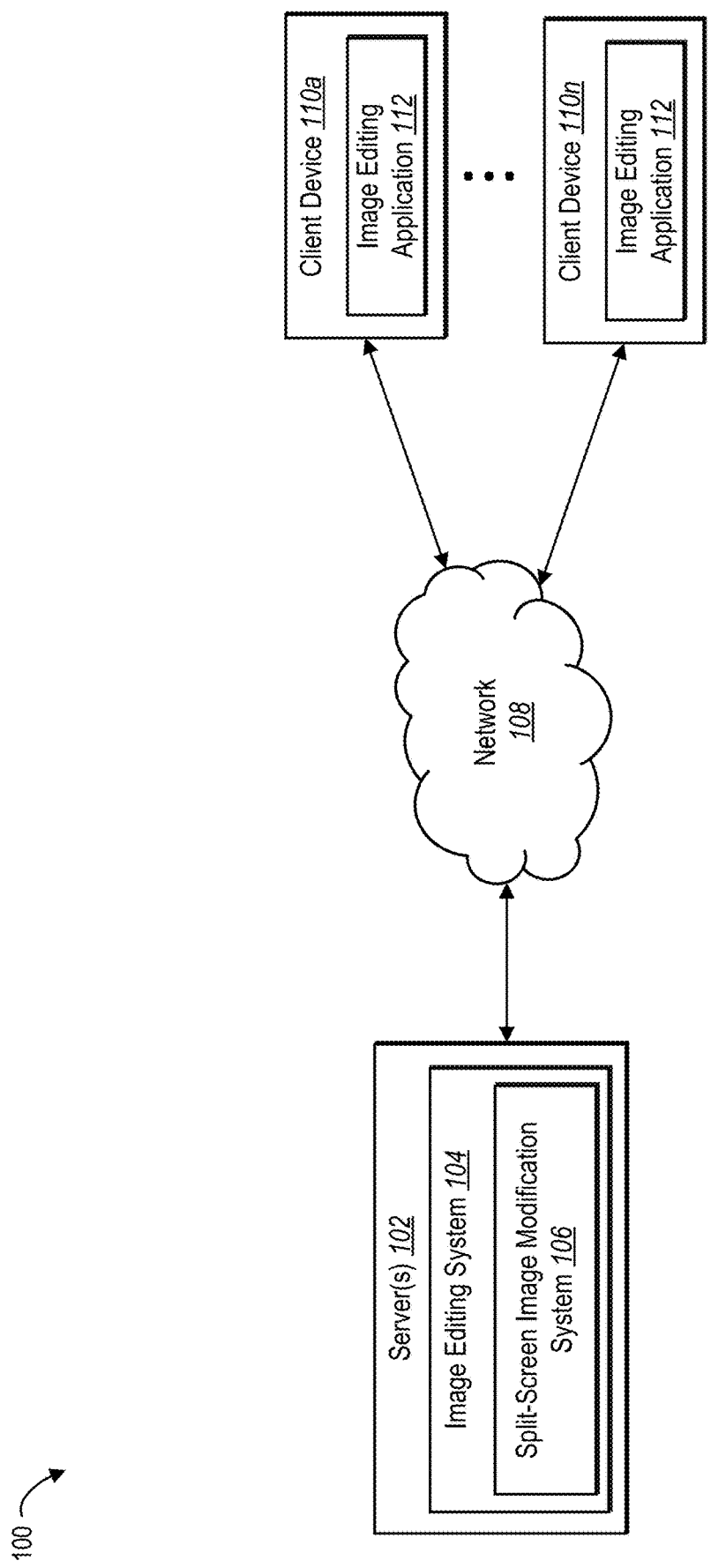
FIG. 1 illustrates an example environment in which a split-screen image modification system operates in accordance with one or more embodiments.

One or more embodiments described herein include a split-screen image modification system that provides separate views of a digital image using a multi-panel graphical user interface for flexible and precise editing of the digital image. For example, in one or more embodiments, the split-screen image modification system provides two panels for displaying different portions of a digital image within a graphical user interface. In particular, in some implementations, the split-screen image modification system provides different portions of the digital image—potentially having different zoom levels and/or rotations applied thereto—for display in the panels. In some implementations, the split-screen image modification system further modifies the portion of the digital image displayed in one panel based on a user interaction with the portion of the digital image displayed in the other panel. To illustrate, in at least one implementation, the split-screen image modification system clones (e.g., copies), onto a portion of the digital image displayed in one panel, pixels selected by a user from a portion of the digital image displayed in the other panel.

To provide an illustration, in one or more embodiments, the split-screen image modification system divides a graphical user interface displayed on a client device into a first panel and a second panel. Further, the split-screen image modification system provides a first portion of a digital image for display in the first panel and a second portion of the digital image for display in the second panel. Additionally, the split-screen image modification system receives a user interaction with a first set of pixels from the first portion of the digital image displayed in the first panel. Based on the user interaction with the first set of pixels, the split-screen image modification system modifies a second set of pixels from the second portion of the digital image displayed in the second panel.

As just mentioned, in one or more embodiments, the split-screen image modification system divides the graphical user interface displayed on a client device into a first panel and a second panel. In some implementations, the split-screen image modification system divides the graphical user interface into the first and second panels in response to detecting a split-screen trigger. In some cases, the split-screen trigger includes selection of an image-editing tool via the graphical user interface displayed on the client device. In some instances, the split-screen trigger includes selection of an option provided via the graphical user interface to split the screen.

Additionally, as mentioned above, in one or more embodiments, the split-screen image modification system provides a digital image for display in the first panel and the second panel. In particular, in some implementations, the split-screen image modification system provides different portions of the digital image for display in the first and second panels. For example, in some instances, the split-screen image modification system pans the digital image (e.g., in response to user input) within the first panel to display a first portion of the digital image and/or pans the digital image (e.g., in response to user input) within the second panel to display a second portion of the digital image. Indeed, in one or more embodiments, the split-screen image modification system pans the digital image within the first and second panels independently (e.g., without affecting the display of the digital image or portion of the digital image within the other panel).

In some implementations, the split-screen image modification system applies a rotation and/or a zoom level to the digital image (or portion of the digital image) displayed within the first panel and/or the second panel. In some cases, the split-screen image modification applies a first rotation and/or a first zoom level to the first portion of the digital image displayed within the first panel and applies a second rotation and/or a second zoom level to the second portion of the digital image displayed within the second panel. Indeed, in some embodiments, the split-screen image modification system applies a rotation and/or zoom level to the digital image (or portion of the digital image) displayed in one panel without affecting the rotation and/or zoom level of the display of the digital image (or portion of the digital image) in the other panel.

Further as mentioned above, in one or more embodiments, the split-screen image modification system modifies a second set of pixels from the second portion of the digital image displayed in the second panel based on a user interaction with a first set of pixels from the first portion of the digital image displayed in the first panel. To illustrate, in some implementations, the split-screen image modification system receives a user interaction with the first set of pixels designating the first set of pixels as a source location of the digital image from which pixels are to be copied. The split-screen image modification system modifies the second set of pixels by copying the first set of pixels into the position of the second set of pixels. In some cases, the split-screen image modification system modifies the second set of pixels based on receiving an additional user interaction designating the second pixels as a destination location of the digital image having pixels to be copied over (e.g., replaced with copied pixels).

In some instances, the split-screen image modification system modifies the second set of pixels based on mappings between the first panel, the second panel, and the digital image. For example, in some cases, the split-screen image modification system determines a first mapping between the first panel and the digital image. Further, the split-screen image modification system determines a second mapping between the digital image and the second panel. Accordingly, the split-screen image modification system modifies the second set of pixels based on the user interaction with the first set of pixels using the first mapping and the second mapping. In some instances, the split-screen image modification system determines the mappings based on matrices associated with the first panel, the second panel, and the digital image.

The split-screen image modification system can modify the digital image in various other ways based on user interactions with portions of the digital image displayed in one of the panels. For instance, in some implementations, rather than copying the first set of pixels onto the second set of pixels, the split-screen image modification system crops the second set of pixels out of the digital image (e.g., out of the second portion of the digital image) based on a user interaction with the first set of pixels. As an example, in at least one implementation, the split-screen image modification system determines to crop a first amount of pixels (e.g., the first set of pixels) out of the first portion of the digital image based on the user interaction and determines to also crop a corresponding amount of pixels (e.g., the second set of pixels) out of the second portion of the digital image.

As mentioned above, conventional image editing systems suffer from several technological shortcomings that result in inflexible and imprecise operation. For example, conventional image editing systems are often inflexible in that they require edits to be made using a single, rigid editing format. To illustrate, many conventional systems provide a digital image for editing within a single panel of a graphical user interface and modify the digital image based on user interactions received within this panel. In some instances, such as when edits are to be applied using two points of interest that are far from one another on the digital image (e.g., at opposite ends), conventional systems may display the digital image within the panel in its entirety so that both points of interest are visible simultaneously. Such a presentation, however, prevents a detailed display of either point of interest. This problem is exacerbated on mobile devices where the display screens are typically small, the digital images can be large, and the conventional systems provide a highly zoomed-out view in order to fit the full digital image within the single panel.

Additionally, conventional image editing systems often operate imprecisely. In particular, conventional systems often fail to precisely target desired pixels for modification due to the rigid format implemented for editing digital images. In at least one example, where the pixels of a first point of interest are to be copied onto the pixels of a second point of interest, the display of the full digital image within a single panel often causes an imprecise selection of one or both points of interest. In other words, the display can cause selection of undesired pixels (e.g., pixels surrounding the points of interest). Accordingly, such systems may copy unwanted pixels and/or copy over pixels unwantedly. Such a problem can increase in severity on mobile devices where the selection tool (often a finger of the user) occupies a significant portion of screen space.

Some conventional systems attempt to improve the precision of applying edits to a digital image within a single panel by providing a zoomed-in view of the digital image. For example, conventional systems may zoom into the second point of interest allowing for a more precise selection of pixels to copy-over using copied pixels from the first point of interest. Such a zoom level, however, may position the first point of interest outside of the panel displaying the digital image. Some conventional systems copy pixels from one point of interest to another by placing cursors on each point of interest and moving the cursors in tandem so that the pixels from the first point of interest touched by the corresponding cursor are used to copy over the pixels from the second point of interest touched by the corresponding cursor. Without displaying both points of interest simultaneously, however, these systems prevent the user from seeing the pixels being copied, which can result in the copying and replacement of pixels unwantedly (i.e., blind copying).

The split-screen image modification system provides several advantages over conventional systems. For example, the split-screen image modification system operates more flexibly than conventional systems. Indeed, by providing a digital image (or portions of the digital image) for display within multiple panels of a graphical user interface, the split-screen image modification system provides a more flexible format for editing digital images, particularly on hand-held devices. To illustrate, by separately panning, zooming in/out, or rotating portions of the digital image displayed in each panel, the split-screen image modification system flexibly presents a clear display of various points of interest, even those that are located far apart on the digital image.

Additionally, the split-screen image modification system improves the precision of editing digital images. In particular, the split-screen image modification facilitates more precise editing by facilitating more precise targeting of pixels to be copied and/or pixels to be copied over (e.g., replaced with copied pixels). Indeed, by displaying different portions of a digital image within multiple panels that can be panned or provide a zoomed view, the split-screen image modification system provides an improved, more detailed view of various points of interest of a digital image. Accordingly, the split-screen image modification system more precisely detects selections of specific pixels and avoids copying and/or replacing undesired pixels. Further, by providing a multi-panel view of a digital image, the split-screen image modification system provides detailed views of multiple points of interest, preventing blind copying scenarios.

As a result of the more flexible format and the improved precision, the split-screen image modification system is more flexible than conventional systems. For example, in one or more embodiments, the split-screen image modification system enables precise image editing directly on a mobile device with limited screen space (such as a smart phone or tablet). Thus, although conventional systems often require computing devices having large screens to make precise, detailed edits based on user selections of specific pixels, the split-screen image modification system can facilitate such edits on smaller devices.

Additional detail regarding the split-screen image modification system will now be provided with reference to the figures. For example, FIG. 1 illustrates a schematic diagram of an exemplary system 100 in which a split-screen image modification system 106 can be implemented. As illustrated in FIG. 1, the system 100 includes a server(s) 102, a network 108, and client devices 110*a*-110*n*.

Although the system 100 of FIG. 1 is depicted as having a particular number of components, the system 100 can have any number of additional or alternative components (e.g., any number of servers, client devices, or other components in communication with the split-screen image modification system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 9). Moreover, the server(s) 102 and the client devices 110*a*-110*n* include computing devices such as those discussed in greater detail with relation to FIG. 9.

As mentioned above, the system 100 includes the server(s) 102. In one or more embodiments, the server(s) 102 generates, stores, receives, and/or transmits data including digital images and modified digital images. For example, in some embodiments, the server(s) 102 receives a digital image from a client device (e.g., one of the client devices 110*a*-110*n*) and transmits a modified digital image to the client device. In one or more embodiments, the server(s) 102 comprises a data server. In some implementations, the server(s) 102 comprises a communication server or a web-hosting server.

As shown in FIG. 1, the server(s) 102 includes an image editing system 104. In one or more embodiments, the image editing system 104 provides functionality by which a user (e.g., a user of one of the client devices 110*a*-110*n*) generates, edits, manages, and/or stores digital images. For example, in some instances, a user utilizes a client device to send a digital image to the image editing system 104 hosted on the server(s) 102 via the network 108. The image editing system 104 then provides many options that the user may use to edit the digital image, store the digital image, and subsequently search for, access, and view the digital image.

Additionally, the server(s) 102 includes the split-screen image modification system 106. In particular, in one or more embodiments, the split-screen image modification system 106 utilizes the server(s) 102 to provide a split-screen display for modifying a digital image. For example, the split-screen image modification system 106 can utilize the server(s) 102 to divide the display screen of a computing device into multiple panels and modify a digital image based on user interactions with at least one of the panels.

To illustrate, in one or more embodiments, the split-screen image modification system 106, based on a trigger from the server(s) 102, divides a graphical user interface displayed on a client device (e.g., one of the client devices 110*a*-110*n*) into a first panel and a second panel. The split-screen image modification system 106, via the server(s) 102, further provides a first portion of a digital image for display in the first panel and a second portion of the digital image for display in the second panel. The split-screen image modification system 106 further receives a user interaction with a first set of pixels from the first portion of the digital image displayed in the first panel. Based on the user interaction with the first set of pixels, the split-screen image modification system 106, via the server(s) 102, modifies a second set of pixels from the second portion of the digital image displayed in the second panel.

In one or more embodiments, the client devices 110*a*-110*n* include computing devices that can access, edit, store, and/or provide, for display, digital images. For example, the client devices 110*a*-110*n* can include smartphones, tablets, desktop computers, laptop computers, head-mounted-display devices, or other electronic devices. The client devices 110*a*-110*n* include one or more applications (e.g., the image editing application 112) that can access, edit, segment, modify, store, and/or provide, for display, digital images. For example, in one or more embodiments, the image editing application 112 includes a software application installed on the client devices 110*a*-110*n*. In other cases, however, the image editing application 112 includes a software application hosted on the server(s) 102 (and supported by the image editing system 104), which may be accessed by the client devices 110a-110n through another application, such as a web browser.

The split-screen image modification system 106 can be implemented in whole, or in part, by the individual elements of the system 100. Indeed, although FIG. 1 illustrates the split-screen image modification system 106 implemented with regard to the server(s) 102, different components of the split-screen image modification system 106 can be implemented by a variety of devices within the system 100. For example, one or more (or all) components of the split-screen image modification system 106 can be implemented by a different computing device (e.g., one of the client devices 110a-110n) or a separate server from the server(s) 102 hosting the image editing system 104. In particular, in one or more embodiments, the split-screen image modification system 106 is resident on and implemented entirely by a client device (e.g., a mobile computing device). In such cases, the client device may download, or otherwise obtain, the split-screen image modification system from the server(s) 102. Example components of the split-screen image modification system 106 will be described below with regard to FIG. 7.

Figure 2:
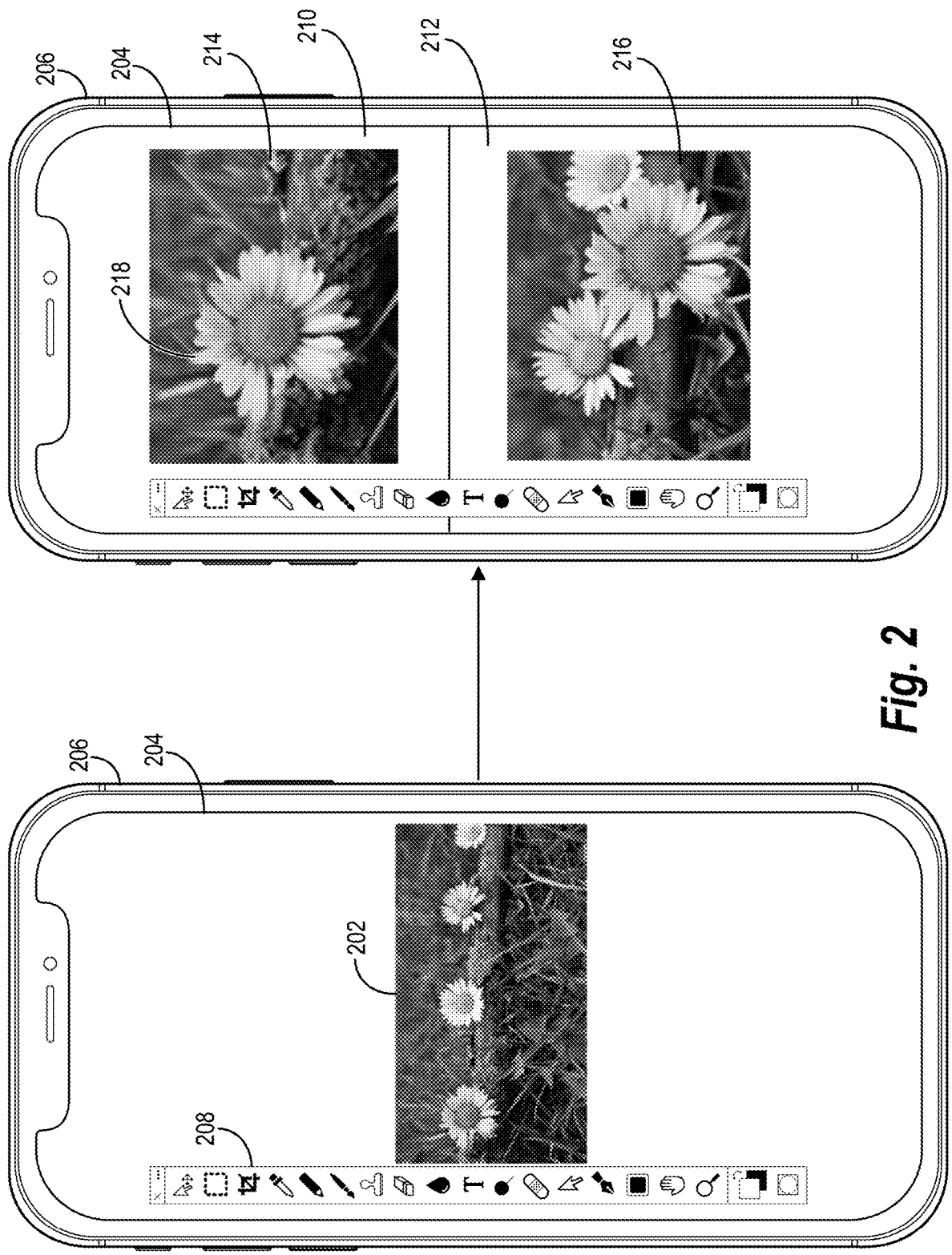
FIG. 2 illustrates the split-screen image modification system modifying a digital image utilizing a split-screen display in accordance with one or more embodiments.

As discussed above, the split-screen image modification system 106 modifies a digital image using a split-screen display. FIG. 2 illustrates an overview diagram of the split-screen image modification system 106 modifying a digital image utilizing a split-screen display in accordance with one or more embodiments. As shown in FIG. 2, the split-screen image modification system 106 provides a digital image 202 for display within a graphical user interface 204 displayed on a client device 206. In one or more embodiments, a digital image includes an image composed of digital data. In particular, in some embodiments, a digital image includes a digital file that is made of digital image data and can be displayed via a user interface. For example, in some implementations a digital image includes a digital photo, a digital rendering (e.g., a scan) of a photograph or other document, or a frame of a digital video. In some implementations, a digital image includes a digitally-generated drawing, chart, map, graph, logo, etc.

In one or more embodiments, a digital image is made of multiple pixels. In one or more embodiments, a pixel includes an element of a digital image. In particular, in some embodiments, a pixel includes a smallest unit of a digital image that can be displayed or represented (e.g., within a graphical user interface). In some implementations, a pixel includes an element of a digital image that is associated with one or more particular attributes or characteristics (e.g., color, location, etc.). In some implementations, the split-screen image modification system 106 can control (e.g., modify) a given pixel or given set of pixels without affecting another pixel or set of pixels. In some instances, a pixel similarly includes an element of a graphical user interface. For example, in at least one implementation, a pixel includes a smallest unit of a graphical user interface for displaying digital data, such as one or more pixels of a digital image.

In one or more embodiments, the split-screen image modification system 106 further provides one or more image-editing tools within the graphical user interface 204. In some embodiments, the split-screen image modification system 106 provides one or more icons corresponding to one or more image-editing tools for display within the graphical user interface 204. For instance, as shown in FIG. 2, the split-screen image modification system provides a tool menu 208 that includes a plurality of icons corresponding to a plurality of image-editing tools.

In one or more embodiments, an image-editing tool includes a feature or set of features that can be implemented to modify a digital image. In particular, in some embodiments, an image-editing tool includes one or more operations that, when applied to a digital image, modify (e.g., edit) one or more characteristics or attributes of the digital image. In some instances, an image-editing tool changes one or more characteristics or attributes of the entire digital image. In some implementations, however, an image-editing tool changes one or more characteristics or attributes of a portion of a digital image.

In some cases, in response to detecting a user selection of an image-editing tool (e.g., selection of an icon corresponding to an image-editing tool), the split-screen image modification system 106 modifies the digital image 202 using the selected image-editing tool (e.g., using the feature(s) or operation(s) of the selected image-editing tool). In some instances, however, the split-screen image modification system 106 waits until one or more additional user interactions are received before modifying the digital image 202. For instance, in at least one embodiment, upon detecting selection of an image-editing tool, the split-screen image modification system 106 provides additional options (e.g., submenus) for using the image-editing tool to modify the digital image 202. In some cases, the split-screen image modification system 106 utilizes the image-editing tool to modify a particular portion of the digital image 202 selected by the user.

As shown in FIG. 2, the split-screen image modification system 106 divides the graphical user interface 204 of the client device 206 into a first panel 210 and a second panel 212. In one or more embodiments, a panel includes a distinct portion of a graphical user interface. In particular, in some embodiments, a panel includes a portion of a graphical user interface that displays one or more graphical or visual elements separately from another portion of the graphical user interface (e.g., another panel). For example, in some implementations, a panel includes a window or section of a graphical user interface that is displayed concurrently with another window or section of the graphical user interface. Indeed, in one or more embodiments, the split-screen image modification system provides multiple panels for simultaneous display within a graphical user interface.

In one or more embodiments, the split-screen image modification system 106 divides the graphical user interface 204 in response to detecting a split-screen trigger. In one or more embodiments, a split-screen trigger includes a trigger in response to which the split-screen image modification system 106 divides a graphical user interface into multiple panels. In particular, in some embodiments, a split-screen trigger includes an action or signal that provokes division of a graphical user interface into at least two panels. In some embodiments, a split-screen trigger includes selection of an image-editing tool, such as an image-editing tool that utilizes at least two points of interest of a digital image to modify the digital image. It should be understood, however, that a split-screen trigger includes other actions or signals in some implementations, as will be discussed in more detail below.

As further shown in FIG. 2, the split-screen image modification system 106 provides a first portion 214 of the digital image 202 for display in the first panel 210 and provides a second portion 216 of the digital image 202 for display in the second panel 212. In one or more embodiments, a portion of a digital image includes a segment of a digital image. In particular, in some embodiments, a portion of a digital image includes a section of a digital image that is less than the entirety of the digital image. For example, in some implementations, a portion of a digital image includes a subset of pixels from the set of pixels that make up the digital image.

Additionally, in one or more embodiments, the split-screen image modification system 106 modifies the digital image 202 using the first panel 210 and the second panel 212. To illustrate, as shown in FIG. 2, the split-screen image modification system 106 modifies a set of pixels from the second portion 216 of the digital image 202 based on a user interaction with a set of pixels from the first portion 214 of the digital image 202. In particular, the split-screen image modification system 106 copies the set of pixels from the first portion 214 of the digital image 202 (e.g., pixels associated with the flower 218) onto the set of pixels from the second portion 216 of the digital image 202.

Indeed, much of the following discusses utilizing a multi-panel graphical user interface to modify a digital image by copying pixels from one portion of a digital image displayed in one panel onto pixels from another portion of a digital image displayed in another panel. Certainly, the split-screen image modification system 106 provides several advantages over conventional systems when implementing such a feature. It should be noted, however, that the split-screen image modification system 106 can utilize a multi-panel graphical user interface for modifying a digital image with various alternative or additional methods. At least one additional example will be discussed below.

As discussed above, the split-screen image modification system 106 divides a graphical user interface into multiple panels. FIG. 3 illustrates a diagram for dividing a graphical user interface into multiple panels in accordance with one or more embodiments. Indeed, as shown in FIG. 3, the split-screen image modification system 106 provides a digital image 302 for display within a graphical user interface 304 of a client device 306. Particularly, it should be noted that the graphical user interface 304 initially includes a single panel for displaying the digital image. Further, the split-screen image modification system 106 provides a tool menu 308 that includes a plurality of icons corresponding to a plurality of image-editing tools.

As further shown in FIG. 3, the split-screen image modification system 106 divides the graphical user interface 304 of the client device 306 into a first panel 310 and a second panel 312. As mentioned, in one or more embodiments, the split-screen image modification system 106 divides the graphical user interface 304 in response to detecting a split-screen trigger. For example, as shown in FIG. 3, the split-screen image modification system 106 divides the graphical user interface 304 in response to detecting a selection of an image-editing tool (e.g., selection of an icon 314 corresponding to an image-editing tool).

In some instances, the icon 314 corresponds to an image-editing tool that utilizes at least two points of interest of the digital image 302 for modifying the digital image 302. In one or more embodiments, a point of interest includes a portion of a digital image that is targeted for modifying the digital image. In particular, in some embodiments, a point of interest includes one or more pixels of a digital image that are targeted for modification of the digital image. For example, in some implementations, a point of interest includes one or more pixels to be modified (referred to as a destination location) or one or more pixels to be used in modifying other pixels (referred to as a source location). In some implementations, however, the icon 314 corresponds to an image-editing tool that only utilizes a single point of interest of the digital image 302 to modify the digital image 302.

The split-screen image modification system 106 divides the graphical user interface 304 in response to various other triggers in other embodiments. For example, in response to detecting selection of an image-editing tool (e.g., selection of the icon 314 corresponding to the image-editing tool), the split-screen image modification system 106 provides an option for dividing the graphical user interface 304 in some implementations. Upon detection selection of the option, the split-screen image modification system 106 divides the graphical user interface 304. In some instances, the split-screen image modification system 106 provides an option within the tool menu 308 or some other menu displayed within the graphical user interface 304 enabling a direct selection of the option for dividing the graphical user interface 304. Accordingly, in some cases, the split-screen image modification system 106 offers flexibility by enabling user control over when the graphical user interface 304 is divided.

As further shown in FIG. 3, the split-screen image modification system 106 provides the digital image 302 for display in the first panel 310 and the second panel 312. Indeed, the split-screen image modification system 106 utilizes the first panel 310 and the second panel 312 to provide separate displays of the digital image 302. Though FIG. 3 shows the first panel 310 and the second panel 312 displaying the digital image 302 in its entirety, the split-screen image modification system 106 provides the digital image 302 for display in the first and second panels 310, 312 in whatever form the digital image 302 was displayed at the time of dividing the graphical user interface 304 in some cases. For example, in at least one instance, where the graphical user interface 304 displayed a zoomed-in view that focused on a particular portion of the digital image 302 at the time of dividing, the split-screen image modification system 106 provides such a zoomed-in view for display within the first panel 310 and the second panel 312. As another example, where the graphical user interface 304 displayed a rotated view of the digital image 302 at the time of dividing the graphical user interface 304, the split-screen image modification system 106 provides such a rotated view for display within the first and second panels 310, 312.

Figure 4:
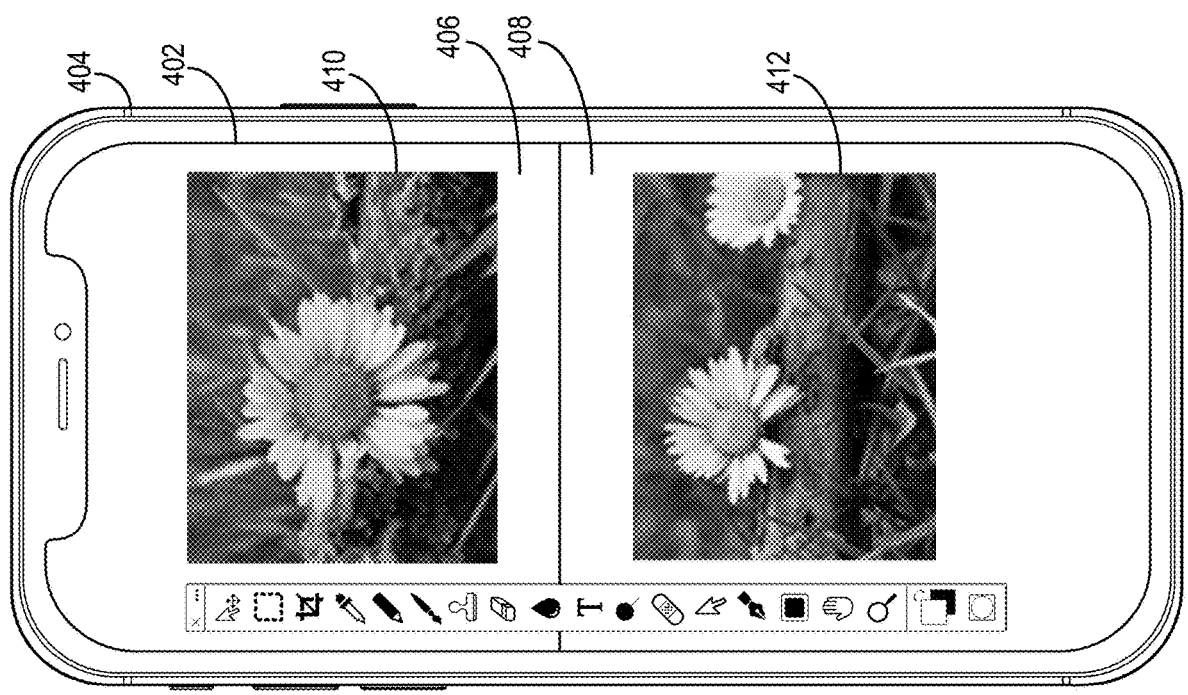
FIG. 4 illustrates the split-screen image modification system displaying different portions of a digital image on a client device via multiple panels in accordance with one or more embodiments.

As indicated above, in some implementations, the split-screen image modification system 106 provides different portions of a digital image for separate display within panels of a divided graphical user interface. FIG. 4 illustrates a graphical user interface 402 used by the split-screen image modification system 106 to display different portions of a digital image on a client device 404 in accordance with one or more embodiments.

Indeed, as shown in FIG. 4, the split-screen image modification system 106 divides the graphical user interface 402 into a first panel 406 and a second panel 408 (as discussed above with reference to FIG. 3). Further, as shown, the split-screen image modification system 106 provides a first portion 410 of a digital image for display within the first panel 406 and provides a second portion 412 of the digital image for display in the second panel 408. Indeed, in one or more embodiments, the first portion 410 and the second portion 412 correspond to the same digital image, but different portions of that digital image. For example, as shown in FIG. 4, the split-screen image modification system 106 provides the left side of a digital image (e.g., the digital image 302 discussed with reference to FIG. 3) for display in the first panel 406 and provides the right side of the same digital image for display in the second panel 408.

In one or more embodiments, the split-screen image modification system 106 provides the first portion 410 of the digital image for display in the first panel 406 and the second portion 412 of the digital image for display in the second panel 408 by modifying the display of the digital image within the first and second panels 406, 408, respectively. To illustrate, in some instances, the split-screen image modification system 106 provides the first portion 410 of the digital image for display in the first panel 406 by panning the digital image within the first panel 406 to display the first portion 410. Indeed, as discussed above with reference to FIG. 3, the split-screen image modification system 106 displays the entirety of the digital image (or displays a different portion of the digital image) within the first panel 406 upon dividing the graphical user interface 402 in some instances. Accordingly, in some cases, the split-screen image modification system 106 repositions the digital image within the first panel 406 by panning the digital image (e.g., in response to a user interaction with the digital image via the first panel 406) until the first portion 410 of the digital image is displayed within the first panel 406. Similarly, in some embodiments, the split-screen image modification system 106 provides the second portion 412 of the digital image for display in the second panel 408 by panning the digital image within the second panel 408 (e.g., in response to a user interaction with the digital image via the second panel 408) to display the second portion 412.

Indeed, in some implementations, the split-screen image modification system 106 repositions the digital image (or a portion of the digital image) within the first panel 406 and the second panel 408 separately. In particular, the split-screen image modification system 106 repositions the digital image (or the first portion 410 of the digital image) within the first panel 406 while maintaining a position of the digital image (or the second portion 412 of the digital image) within the second panel 408 or vice versa.

In one or more embodiments, the split-screen image modification system 106 modifies the display of the digital image (or a portion of the digital image) separately within the first and second panels 406, 408 using various other actions. For example, in some implementations, the split-screen image modification system 106 modifies the display of the first portion 410 of the digital image by applying a zoom level to the first portion of 410 of the digital image within the first panel 406. In one or more embodiments, a zoom level includes a size or magnification at which a digital image (or a portion of the digital image) is displayed. For example, in some instances, zoom level includes a zoomed-in level (e.g., an increase magnification), a zoomed-out level (e.g., a decrease in magnification), or a level at which no zoom is applied.

In some implementations, the split-screen image modification system 106 applies the zoom level to the first portion 410 of the digital image while maintaining a current zoom level of the second portion 412 of the digital image within the second panel 408 or vice versa. In some cases, the split-screen image modification system 106 applies a first zoom level to the first portion 410 of the digital image within the first panel 406 and applies a second zoom level to the second portion 412 of the digital image within the second panel 408.

As another example, in some instances, the split-screen image modification system 106 applies a rotation to the digital image (or a portion of the digital image) while maintaining a current rotation (e.g., or no rotation) of the second portion 412 of the digital image within the second panel 408 or vice versa. In some cases, the split-screen image modification system 106 applies a first rotation to the first portion 410 of the digital image within the first panel 406 and applies a second rotation to the second portion 412 of the digital image within the second panel 408. In one or more embodiments, the split-screen image modification system 106 applies a zoom level or a rotation in response to receiving an interaction with the digital image (or the portion of the digital image) within the respective panel.

Thus, the split-screen image modification system 106 operates more flexibly than conventional systems. For example, the split-screen image modification system 106 facilitates flexible control of how a digital image (or portion of a digital image) is displayed within a graphical user interface. In particular, the split-screen image modification system 106 operates more flexibly by independently displaying and controlling the display of different portions of a digital image within different panels provided in a graphical user interface. Accordingly, the split-screen image modification system 106 offers a clear display of different portions of a digital image (e.g., having different points of interest) where the digital image would otherwise be too large to clearly display those portions using a conventional system. Indeed, such a benefit enables more flexible deployment of the split-screen image modification system on mobile devices where the display screens are relatively small.

Figure 5:
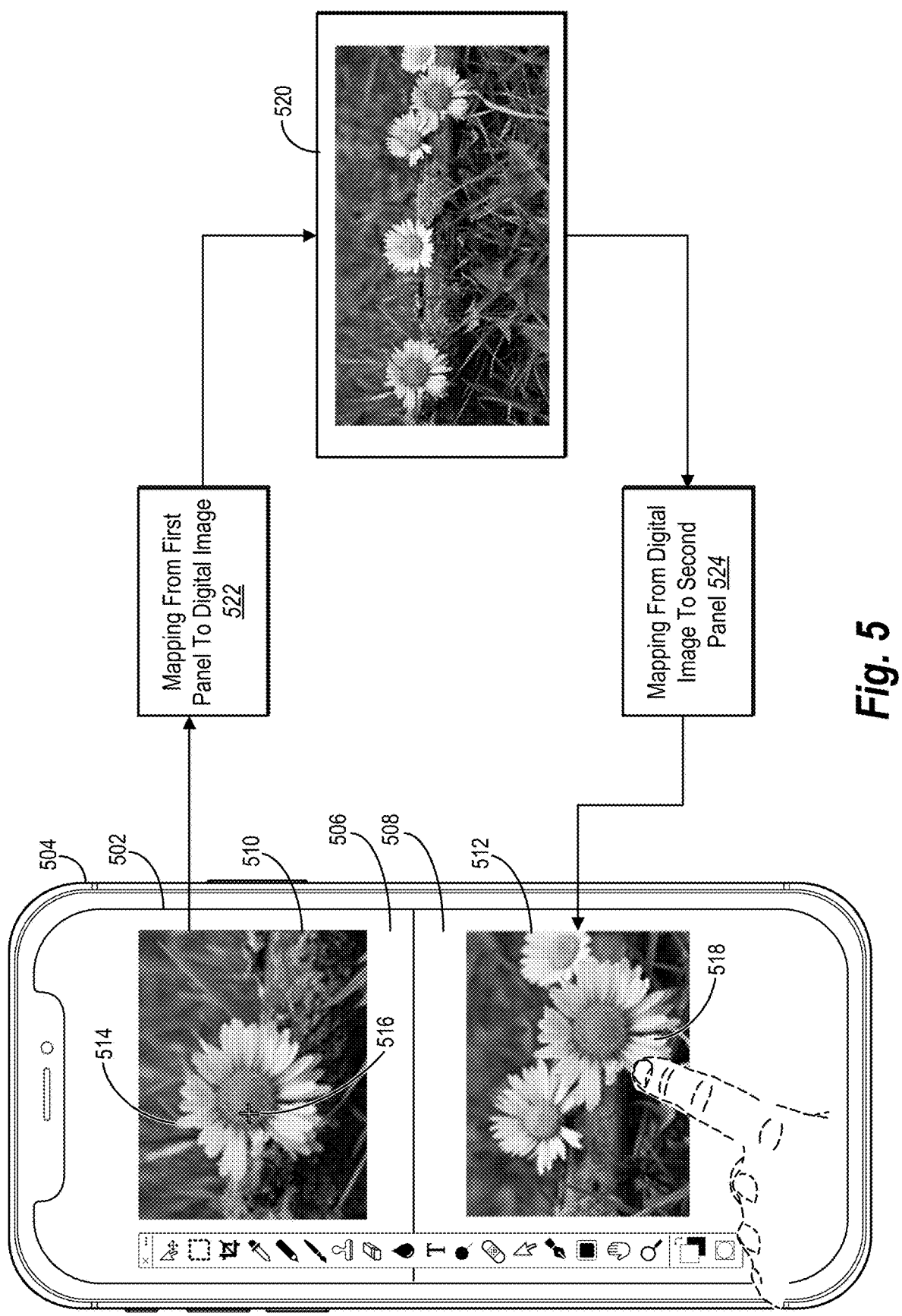
FIG. 5 illustrates the split-screen image modification system modifying one portion of a digital image displayed in one panel based on a user interaction with another portion displayed in another panel in accordance with one or more embodiments.

As further discussed above, the split-screen image modification system 106 modifies one portion of the digital image display in one panel based on a user interaction with another portion of the digital image received via another panel. FIG. 5 illustrates a diagram for modifying one portion of a digital image displayed in one panel based on a user interaction with another portion displayed in another panel in accordance with one or more embodiments.

Indeed, as shown in FIG. 5, the split-screen image modification system 106 divides the graphical user interface 502 of a client device 504 into a first panel 506 and a second panel 508. Further, the split-screen image modification system 106 provides a first portion 510 of a digital image 520 for display in the first panel 506 and provides a second portion 512 of the digital image 520 for display in the second panel 508.

In one or more embodiments, the split-screen image modification system 106 modifies the second portion 512 of the digital image 520 within the second panel 508 based on a user interaction with the first portion 510 of the digital image 520 within the first panel 506. In particular, the split-screen image modification system 106 modifies, in response to a user interaction with a first set of pixels from the first portion 510 of the digital image 520, a second set of pixels from the second portion 512 of the digital image 520.

To illustrate, in one or more embodiments, the split-screen image modification system 106 establishes a first set of pixels from the first portion 510 of the digital image 520 (e.g., the set of pixels associated with the flower 514) as a source location having pixels to be copied. In some cases, the split-screen image modification system 106 establishes the first set of pixels as the source location in response to receiving a user interaction with the first set of pixels. In some implementations, as shown in FIG. 5, the split-screen image modification system 106 places a cursor 516 for display within the first panel 506 on the first set of pixels. In at least one example, the cursor 516 is movable and the split-screen image modification system 106 copies the pixels touched by the cursor 516 (e.g., the center of the cursor 516).

In other words, the split-screen image modification system 106 includes the pixels that touch the cursor 516 within the first set of pixels.

As mentioned, the split-screen image modification system 106 modifies the second set of pixels from the second portion 512 of the digital image 520 based on the user interaction with the first set of pixels. For example, as shown in FIG. 5, in some implementations, the split-screen image modification system copies the first set of pixels onto the second set of pixels (as illustrated by the flower 518 copied onto the second portion 512 of the digital image 520).

In one or more embodiments, the split-screen image modification system 106 establishes the second set of pixels from the second portion 512 of the digital image 520 as a destination location having pixels to be copied over. In some cases, the split-screen image modification system 106 establishes the second set of pixels as the destination location in response to receiving one or more additional user interactions with the second set of pixels. In some implementations, the split-screen image modification system 106 places a cursor (not shown) within the second panel 508 on the second set of pixels. In at least one example, the cursor is movable and the split-screen image modification system 106 copies over the pixels touched by the cursor (e.g., the center of the cursor). In other words, the split-screen image modification system 106 includes the pixels that touch the cursor within the second set of pixels.

To provide an illustration, in one or more embodiments, the split-screen image modification system 106 receives a user interaction establishing the first set of pixels from the first portion 510 of the digital image 520 as a source location having pixels to be copied. Further, the split-screen image modification system 106 receives one or more additional user interactions establishing the second set of pixels from the second portion 512 of the digital image 520 as a destination location having pixels to be copied over. In some implementations, the additional user interactions include user interactions having movement (e.g., of a cursor or a user's finger as shown in FIG. 5) across the second set of pixels indicating the particular pixels to be copied over. Upon detecting the movement across the second set of pixels, the split-screen image modification system 106 tracks the movement across the first set of pixels (e.g., by moving the cursor 516 across the first set of pixels in tandem with the movement across the second set of pixels and identifying the particular pixels from the first set of pixels that touch the cursor 516).

Thus, for a given time step, the split-screen image modification system 106 determines one or more pixels from the second set of pixels with which there is a current user interaction (e.g., pixels currently touched by a cursor or user's finger within the second panel 508). Further, the split-screen image modification system 106 determines the one or more corresponding pixels from the first set of pixels based on tracking the movement of the additional user interaction across the second set of pixels. Accordingly, the split-screen image modification system 106 copies the one or more pixels from the first set of pixels onto the one or more pixels from the second set of pixels.

As shown in FIG. 5, the split-screen image modification system 106 further modifies the second set of pixels from the second portion 512 of the digital image 520 based on one or more mappings between the digital image 520 and the first and second panels 506, 508. In one or more embodiments, a mapping includes an association between sets of digital data. In particular, a mapping identifies, for an instance of digital data from one set of digital data, a corresponding instance of digital data from another set of digital data. For example, in some implementations, a mapping between a panel and a digital image indicates which instance of digital data from the digital image corresponds to a given instance of digital data from the panel. In some implementations, a mapping includes a transformation matrix.

For example, as shown, the split-screen image modification system 106 determines a mapping 522 from the first panel 506 to the digital image 520 (e.g., maps the first panel 506 to the digital image 520). Further, the split-screen image modification system 106 determines a mapping 524 from the digital image 520 to the second panel 508 (e.g., maps the digital image 520 to the second panel 508). Indeed, in one or more embodiments, because the first set of pixels from the first panel 506 are used to modify the second set of pixels from the second panel 508, the split-screen image modification system 106 maps the first panel 506 to the digital image 520 and further maps the digital image 520 to the second panel 508 (e.g., in the reverse direction). In some implementations, the split-screen image modification system 106 determines the mapping 522 by mapping the pixels of the first panel 506 to pixels of the digital image 520. Similarly, the split-screen image modification system 106 determines the mapping 524 by mapping the pixels of the digital image 520 to pixels of the second panel 508. Thus, by determining the mappings 522, 524, the split-screen image modification system 106 determines an association between the first set of pixels displayed in the first panel 506 and the second set of pixels displayed in the second panel 508.

In one or more embodiments, the split-screen image modification system 106 determines the mappings 522, 524 based on one or more matrices. For example, in some cases, the split-screen image modification system 106 identifies or generates a matrix for each of the first panel 506, the second panel 508, and the digital image 520. In some implementations, the matrix for the first panel 506 includes values (e.g., numerical values) representing the first panel 506. For example, in some implementations, the matrix for the first panel 506 includes values representing the panning, the zoom level, and/or the rotation used to display the first portion 510 of the digital image 520 within the first panel 506. In one or more embodiments, each value of the matrix for the first panel 506 represents a particular pixel of the first panel. Likewise, in one or more embodiments, the matrix for the second panel 508 includes values representing the second panel 508, such as the panning, the zoom level, and/or the rotation used to display the second portion 512 of the digital image 520 within the second panel 508. Further, in some implementations, the matrix associated with the digital image 520 includes values representative of the digital image 520, such as values representing the location of pixels within the digital image 520 and/or the color and brightness associated with those pixels. In some implementations, each value in the matrix for the digital image 520 represents a particular pixel of the digital image 520. In one or more embodiments, the split-screen image modification system 106 determines the mappings 522, 524 by mapping the values of the respective matrices.

As shown in FIG. 5, the split-screen image modification system 106 modifies the digital image 520 by modifying the second set of pixels from the second portion 512 of the digital image 520 based on the user interaction with the first set of pixels from the first portion 510 of the digital image 520. For example, the split-screen image modification system 106 modifies the second set of pixels based on the pixels that contact the cursor 516 as the cursor 516 moves across the first set of pixels. Further, the split-screen image modification system 106 modifies the second set of pixels based on the mapping 522 from the first panel 506 to the digital image 520. Additionally, the split-screen image modification system 106 provides the modified second set of pixels for display within the second panel 508. In particular, the split-screen image modification system 106 provides the modified second set of pixels for display based on the mapping 524 from the digital image 520 to the second panel 508.

To illustrate the modification of the second set of pixels from the second portion 512 of the digital image 520, the split-screen image modification system 106 determines pixels from the first set of pixels to copy onto pixels from the second set of pixels by tracking movement (e.g., via the cursor 516) across the first set of pixels. In one or more embodiments, the movement across the first set of pixels corresponds to movement across the second set of pixels determined based on one or more user interactions across the second set of pixels. Upon determining the pixels from the first set of pixels to copy, the split-screen image modification system 106 modifies the digital image 520 by copying the pixels from the first set of pixels onto the second set of pixels using the mapping 522. In one or more embodiments, the split-screen image modification system 106 determines the pixels from the second set of pixels to modify (e.g., to copy over) based on the one or more user interactions across the second set of pixels. The split-screen image modification system 106 further provides the modified second set of pixels for display within the second panel 508 using the mapping 524.

Accordingly, the split-screen image modification system 106 provides portions of a digital image for display in a first panel and a second panel within a graphical user interface. The split-screen image modification system 106 further utilizes a mapping between the first and second panels to use a first set of pixels from the first portion of the digital image displayed in the first panel to modify a second set of pixels from the second portion of the digital image displayed in the second panel. Indeed, in one or more embodiments, the split-screen image modification system 106 maps the first panel to the second panel by determining a mapping from the first panel to the digital image (e.g., the mapping 522) and determining a mapping from the digital image to the second panel (e.g., the mapping 524). Accordingly, the algorithms and acts described with reference to FIG. 5 can comprise the corresponding structure for performing a step for mapping the first panel to the second panel. Further, the algorithms and acts described with reference to FIG. 5 can comprise the corresponding structure for modifying a second set of pixels from a second portion of a digital image by performing a step for mapping a first panel to a second panel.

Figure 6:
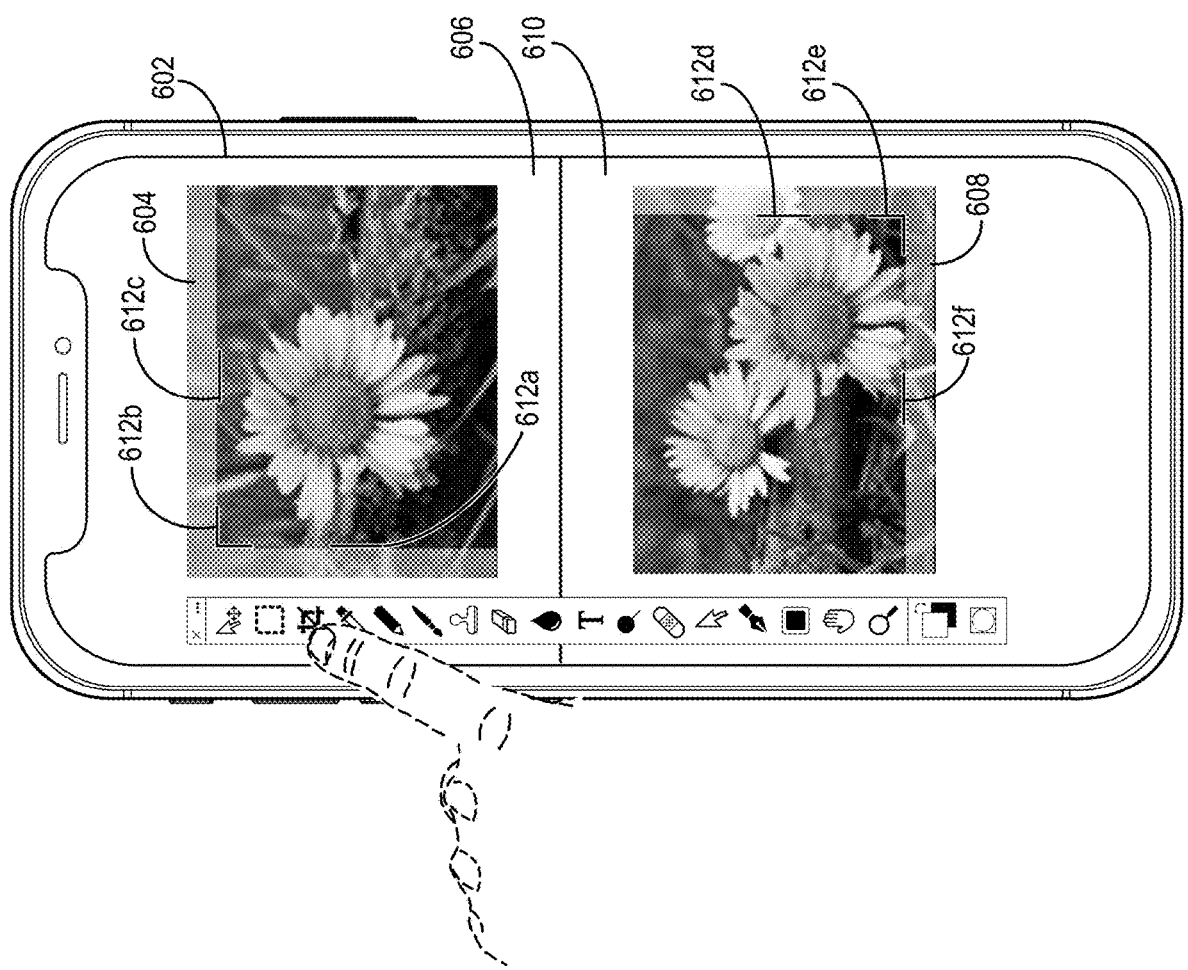
FIG. 6 illustrates a graphical user interface used by the split-screen image modification system to crop a digital image in accordance with one or more embodiments.

As mentioned above, the split-screen image modification system 106 can utilize a multi-panel display for implementing various other modifications of a digital image. For example, in some embodiments, the split-screen image modification system 106 utilizes a multi-panel display for cropping a digital image. FIG. 6 illustrates a graphical user interface 602 used by the split-screen image modification system 106 to crop a digital image in accordance with one or more embodiments.

Indeed, as shown in FIG. 6, the split-screen image modification system 106 provides a first portion 604 of a digital image for display in a first panel 606 and provide a second portion 608 of the digital image for display in a second panel 610. As further shown, the split-screen image modification system 106 provides crop handles 612a-612c for display within the first panel 606 and provides crop handles 612d-612f for display within the second panel 610. In one or more embodiments, a crop handle (also referred to as a cropping indicator) includes a visual element that indicates pixels cropped out of an image. In particular, in some embodiments, a crop handle is associated with a boundary where pixels on one side are included in the image and pixels on the other side are excluded from (i.e., cropped out of) the image. In one or more embodiments, the split-screen image modification system 106 provides the crop handles 612a-612f for display in response to detecting a user selection of an icon (e.g., from the tool menu) that corresponds to a cropping tool.

As further shown in FIG. 6, the split-screen image modification system 106 receives a user interaction with a first set of pixels from the first portion 604 of the digital image. In particular, the split-screen image modification system 106 receives a user interaction with the crop handle 612a. As shown, the user interaction indicates pixels to crop out of the first portion 604 of the digital image. Accordingly, in response to receiving the user interaction, the split-screen image modification system 106 crops the indicated pixels (e.g., the first set of pixels) out of the first portion 604 of the digital image.

Additionally, as shown in FIG. 6, in response to receiving the user interaction with the first set of pixels, the split-screen image modification system 106 modifies a second set of pixels from the second portion 608 of the digital image. In particular, the split-screen image modification system 106 crops the second set of pixels out of the second portion 608 of the digital image. In one or more embodiments, the second set of pixels corresponds to the first set of pixels in that the split-screen image modification system 106 determines to crop an amount of pixels from the second portion 608 of the digital image based on the amount of pixels cropped out of the first portion 604 of the digital image. As an example, in some cases, upon detecting the user interaction moving the crop handles 612a-612c a given amount to indicate pixels to crop out of the first portion 604 of the digital image, the split-screen image modification system 106 moves the crop handles 612d-612f a corresponding amount to crop out pixels from the second portion 608 of the digital image.

In one or more embodiments, the split-screen image modification system 106 utilizes mappings to modify the second set of pixels based on the user interaction with the first set of pixels as described above with reference to FIG. 5. Indeed, the split-screen image modification system 106 utilizes a mapping from the first panel 606 to the digital image to modify the digital image by modifying the second set of pixels based on the user interaction with the first set of pixels. Further, the split-screen image modification system 106 utilizes a mapping from the digital image to the second panel 610 to provide the modified second set of pixels for display within the second panel 610.

Thus, the split-screen image modification system 106 operates more flexibly than conventional systems. In particular, the split-screen image modification system 106 provides a more flexible format for editing digital images. For example, by providing a digital image for display within multiple panels of a graphical user interface, the split-screen image modification system 106 facilitates focusing on different portions of a digital image with different points of interest within those panels. Further, by allowing for the portions of a digital image to be separately panned, zoomed in or out, or rotated within their respective panels, the split-screen image modification system 106 flexibly presents a clear display of separate points of interest, even when there is a large distance between those points of interest within the digital image itself.

Further, the split-screen image modification system 106 operates with better precision when compared to conventional systems. For example, the split-screen image modification system 106 more precisely utilizes one point of interest in a digital image to modify another point of interest, even where there is a large separation between the points of interest. To illustrate, by providing clear displays of the separate points of interest within multiple panels, the split-screen image modification system 106 more precisely determines which pixels a user is indicating to use in modifying a digital image. In particular, the split-screen image modification system 106 allows for more precise user input via a focused display of a particular point of interest, and therefore more precisely determines selected pixels. Further, the split-screen image modification system 106 allows for simultaneous viewing of both points of interest, preventing scenarios, such as blind copying scenarios, where a user may accidentally copy unwanted pixels or copy onto pixels unwantedly because one of the points of interest out of view.

Accordingly, the split-screen image modification system 106 can be more flexibly deployed on different computing devices. In particular, the advantages discussed above allow for flexible deployment of the split-screen image modification system 106 on mobile computing devices that typically suffer under conventional systems due to their small screen size. Indeed, by flexibly providing portions of a digital image for display and more precise modification using multiple panels, the split-screen image modification system 106 circumvents issues caused by smaller screen size, which often limits the practical implementation of conventional systems to computing devices with larger screens.

Figure 7:
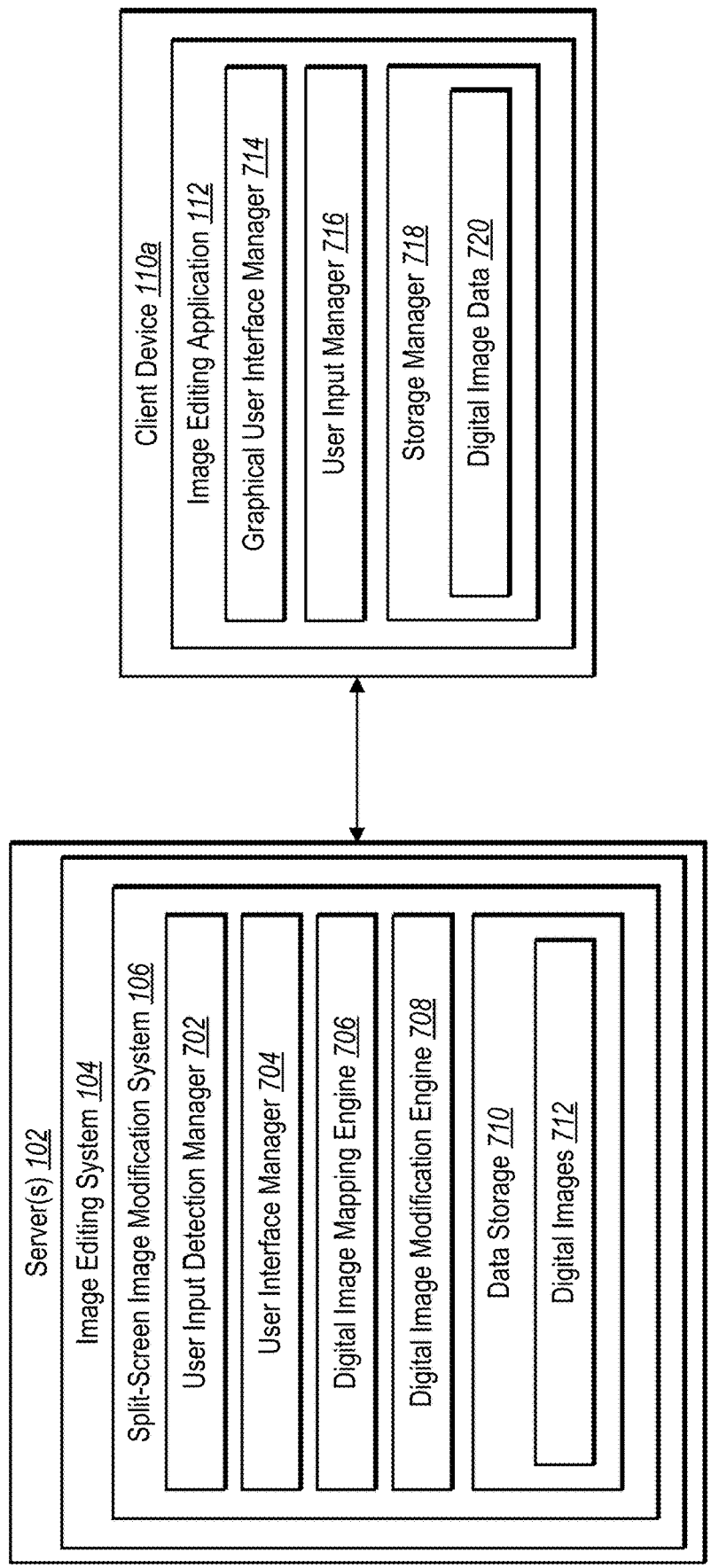
FIG. 7 illustrates an example architecture of a split-screen image modification system in accordance with one or more embodiments.

Turning now to FIG. 7, additional detail will be provided regarding various components and capabilities of the split-screen image modification system 106. In particular, FIG. 7 illustrates the split-screen image modification system 106 implemented by the server(s) 102 and an associated image editing application 112 implemented by a client device 110*a*. Additionally, the split-screen image modification system 106 is also part of the image editing system 104. As shown, in one or more embodiments, the split-screen image modification system 106 includes, but is not limited to, a user input detection manager 702, a user interface manager 704, a digital image mapping engine 706, a digital image modification engine 708, and data storage 710 (which includes digital images 712). Alternatively, in one or more embodiments, the elements mentioned are all implemented by the client device 110*a*.

As just mentioned, and as illustrated in FIG. 7, the split-screen image modification system 106 includes the user input detection manager 702. In one or more embodiments, the user input detection manager 702 detects user inputs. For example, in at least one implementation, the user input detection manager 702 detects user inputs received via a graphical user interface displayed on a client device, such as selection of an icon corresponding to an image-editing tool or one or more interactions with a set of pixels from a portion of a digital image.

Further, as shown in FIG. 7, the split-screen image modification system 106 includes the user interface manager 704. In one or more embodiments, the user interface manager 704 provides various elements for display via a graphical user interface of a client device. For example, in some implementations, the user interface manager 704 divides the graphical user interface into a first panel and a second panel (e.g., in response to a user selection of an image-editing tool or in response to user selection of another option for dividing the graphical user interface). Further, the user interface manager 704 provides a digital image for display in the first panel and the second panel. In some implementations, in response to receiving user interactions, the user interface manager 704 pans, rotates, or zooms in or out of a digital image displayed within a panel to provide a portion of the digital image for display within the panel. In some implementations, the user interface manager 704 provides modified pixels for display within the panel displaying their corresponding portion of the digital image.

Additionally, as shown in FIG. 7, the split-screen image modification system 106 includes the digital image mapping engine 706. In one or more embodiments, the digital image mapping engine 706 determines mappings between a digital image and one or more panels of a graphical user interface. For example, in some implementations, the digital image mapping image determines a first mapping from a first panel to a digital image and determines a second mapping from the digital image to the second panel. In some cases, the digital image mapping engine 706 determines the mappings based on matrices representing the panels and the digital image.

As illustrated by FIG. 7, the split-screen image modification system 106 further includes the digital image modification engine 708. In one or more embodiments, the digital image modification engine 708 modifies a digital image. In particular, the digital image modification engine 708 modifies the digital image based on user interactions with a set of pixels from a portion of the digital image displayed within a panel of a graphical user interface. In some instances, the digital image modification system modifies a set of pixels from a portion of a digital image displayed in one panel based on a user interaction with a different set of pixels from a different portion of the digital image displayed in another panel.

Further, as shown in FIG. 7, the split-screen image modification system 106 includes data storage 710. In particular, data storage 710 includes digital images 712. In one or more embodiments, digital images 712 stores one or more digital images that for viewing and/or editing. In some implementations, the user interface manager 704 retrieves a digital image from digital images 712 and provides the digital image for display within multiple panels of a graphical user interface. In one or more embodiments, digital images 712 further stores modified digital images, such as those modified by the digital image modification engine 708.

Furthermore, the client device 110*a* implements the image editing application 112 with a graphical user interface manager 714, a user input manager 716, and a storage manager 718 (that includes digital image data 720). Alternatively, in one or more embodiments, the elements mentioned are all implemented by the server(s) 102. Furthermore, the elements illustrated in FIG. 7 can be interchanged between the server(s) 102 and the client device 110*a*.

As mentioned above, and as illustrated in FIG. 7, the client device 110*a* includes the graphical user interface manager 714. The graphical user interface manager 714 displays visual elements within a graphical user interface. For example, in some instances, the graphical user interface manager 714 displays an image-editing user interface that includes options for editing a digital image. To illustrate, in at least one instance, the graphical user interface manager 714 displays one or more icons (e.g., within a menu, such as a tool menu) that correspond to image-editing tools. In some instances, the graphical user interface manager 714 further displays one or more panels and displays, within the one or more panels, a digital image or a portion of a digital image. In some cases, the graphical user interface manager 714 further displays modifications to the digital image within one or more of the panels.

As illustrated by FIG. 7, the client device 110*a* also includes the user input manager 716. In some implementations, the user input manager 716 receives user input through a graphical user interface and interprets the user input. For example, the user input manager 716 detects the location of the user input (e.g., whether the user input was received at a displayed menu or within one of the panels). Further, the user input manager 716 determines the nature of the user input, such as whether the user input was a touch, a swipe, a pinch, etc.

Moreover, as illustrated in FIG. 7, the client device 110*a* also implements the storage manager 718. The storage manager 718 maintains data for the split-screen image modification system 106. The storage manager 718 can maintain data of any type, size, or kind as necessary to perform the functions of the split-screen image modification system 106. The storage manager 718, as shown in FIG. 7, includes the digital image data 720.

Digital image data 720 can include information for any digital image utilized by the split-screen image modification system 106. For example, digital image data 720 can include information regarding a digital image utilized by the split-screen image modification system 106 for display within one or more panels of a graphical user interface. Digital image data 720 can further store information regarding modifications applied to the digital image.

Each of the components 702-720 of the split-screen image modification system 106 can include software, hardware, or both. For example, the components 702-720 can include one or more instructions stored on a computer-readable storage medium and executable by processors of one or more computing devices, such as a client device or server device. When executed by the one or more processors, the computer-executable instructions of the split-screen image modification system 106 can cause the computing device(s) to perform the methods described herein. Alternatively, the components 702-720 can include hardware, such as a special-purpose processing device to perform a certain function or group of functions. Alternatively, the components 702-720 of the split-screen image modification system 106 can include a combination of computer-executable instructions and hardware.

Furthermore, the components 702-720 of the split-screen image modification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-720 of the split-screen image modification system 106 may be implemented as a stand-alone application, such as a desktop or mobile application. Furthermore, the components 702-720 of the split-screen image modification system 106 may be implemented as one or more web-based applications hosted on a remote server. Alternatively, or additionally, the components 702-720 of the split-screen image modification system 106 may be implemented in a suite of mobile device applications or "apps." For example, in one or more embodiments, the split-screen image modification system 106 can comprise or operate in connection with digital software applications such as ADOBE® CREATIVE CLOUD® or ADOBE® PHOTOSHOP® EXPRESS. "ADOBE," "CREATIVE CLOUD," and "PHOTOSHOP" are either registered trademarks or trademarks of Adobe Inc. in the United States and/or other countries.

Figure 8:
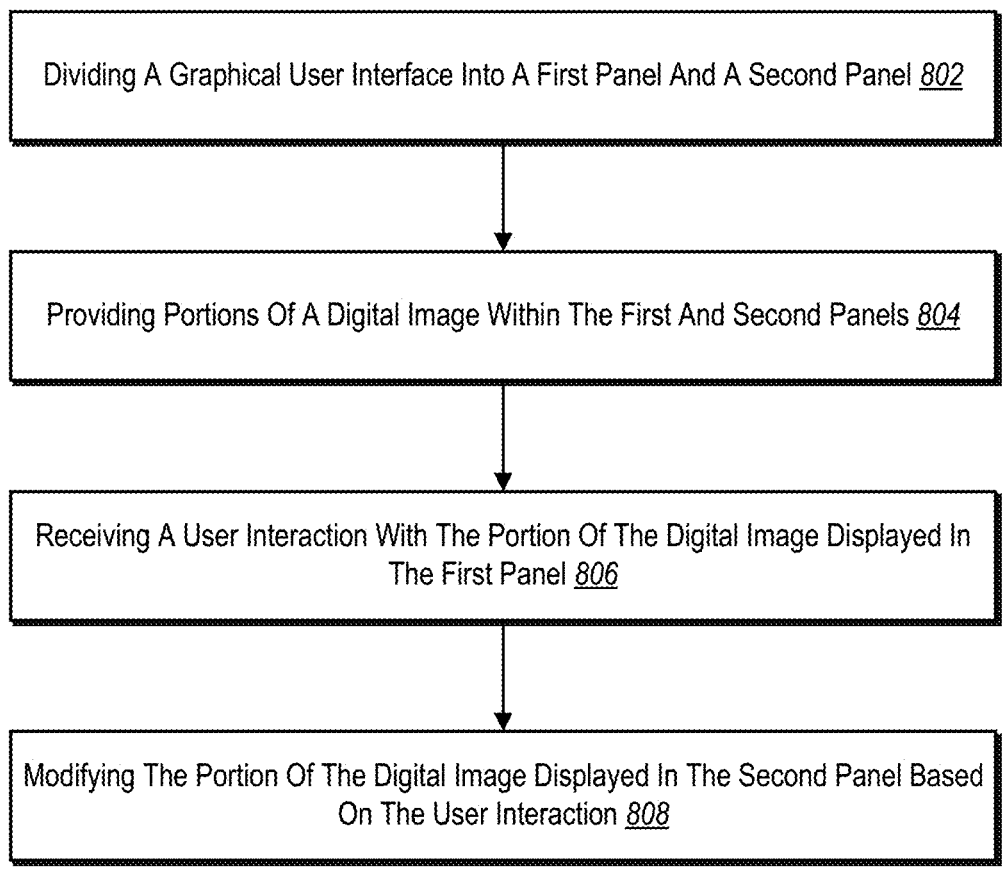
FIG. 8 illustrates a flowchart of a series of acts for utilizing a multi-panel graphical user interface for modifying a set of pixels of a digital image based on a user interaction within another set of pixels of the digital image in accordance with one or more embodiments.

FIGS. 1-7, the corresponding text and the examples provide a number of different methods, systems, devices, and non-transitory computer-readable media of the split-screen image modification system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for utilizing a multi-panel graphical user interface for modifying a set of pixels of a digital image based on a user interaction within another set of pixels of the digital image in accordance with one or more embodiments. While FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed, in a digital medium environment for editing digital images, as part of a computer-implemented method for performing split-screen editing. In some instances, a non-transitory computer-readable medium stores instructions thereon that, when executed by at least one processor, cause a computing device to perform the acts of FIG. 8. In some implementations, a system performs the acts of FIG. 8. For example, in one or more cases, a system includes at least one memory device comprising a digital image. The system further includes at least one server device configured to cause the system to perform the acts of FIG. 8.

The series of acts 800 includes an act 802 of dividing a graphical user interface into a first panel and a second panel. For example, in some embodiments, the act 802 involves dividing a graphical user interface displayed on a client device into a first panel and a second panel. In some cases, dividing the graphical user interface displayed on the client device into the first panel and the second panel comprises dividing the graphical user interface displayed on a mobile computing device into the first panel and the second panel.

In some implementations, the split-screen image modification system 106 detects a split-screen trigger and divides the graphical user interface displayed on the client device into the first panel and the second panel in response to detecting the split-screen trigger. In one or more embodiments, the split-screen image modification system 106 detects the split-screen trigger by detecting a selection of an image-editing tool via the graphical user interface displayed on the client device. Indeed, in some cases, the split-screen image modification system 106 divides the graphical user interface displayed on the client device into the first panel and the second panel in response to detecting selection of an image-editing tool that utilizes at least two points of interest of the digital image for modifying the digital image.

The series of acts 800 also includes an act 804 of providing portions of a digital image within the first and second panels. For example, in some embodiments, the act 804 involves providing a first portion of a digital image for display in the first panel and a second portion of the digital image for display in the second panel.

Further, the series of acts 800 includes an act 806 of receiving a user interaction with the portion of the digital image displayed in the first panel. For example, in one or more embodiments, the act 806 involves receiving a user interaction with a first set of pixels from the first portion of the digital image displayed in the first panel.

In one or more embodiments, the split-screen image modification system 106 receives the user interaction with the first set of pixels from the first portion of the digital image displayed in the first panel by receiving the user interaction establishing the first set of pixels as a source location of the digital image comprising pixels to be copied.

Additionally, the series of acts 800 includes an act 808 of modifying the portion of the digital image displayed in the second panel based on the user interaction. For example, in one or more embodiments, the act 808 involves modifying a second set of pixels from the second portion of the digital image displayed in the second panel based on the user interaction with the first set of pixels.

In some implementations, the split-screen image modification system 106 receives an additional user interaction with the second set of pixels establishing the second set of pixels as a destination location of the digital image comprising pixels to be copied over. Accordingly, the split-screen image modification system 106 modifies the second set of pixels from the second portion of the digital image displayed in the second panel based on the user interaction with the first set of pixels by copying the first set of pixels onto the second set of pixels based on the user interaction with the first set of pixels and the additional user interaction with the second set of pixels.

In one or more embodiments, the split-screen image modification system 106 modifies the second set of pixels using mappings between the first and second panels and the digital image. To illustrate, in some implementations, the split-screen image modification system 106 determines a first mapping between the first panel and the digital image; and determine a second mapping between the digital image and the second panel. Accordingly, the splits-screen image modification system 106 modifies the second set of pixels from the second portion of the digital image displayed in the second panel based on the user interaction with the first set of pixels by: modifying the digital image by modifying the second set of pixels of the second portion of the digital image based on the user interaction with the first set of pixels and the first mapping between the first panel and the digital image; and providing the modified second set of pixels for display in the second panel based on the second mapping between the digital image and the second panel.

In some implementations, the split-screen image modification system 106 determines the first mapping between the first panel and the digital image based on a first matrix comprising values representing the first panel and a second matrix comprising values representing the digital image; and determines the second mapping between the digital image and the second panel based on the second matrix comprising the values representing the digital image and a third matrix comprising values representing the second panel.

To illustrate the above, in one or more embodiments, the split-screen image modification system 106 determines a second set of pixels from the second portion of the digital image to modify based on the user interaction with the first set of pixels; modifies the digital image by modifying the second set of pixels from the second portion of the digital image based on a first mapping between the first panel and the digital image; and provides the modified second set of pixels for display in the second panel based on a second mapping between the digital image and the second panel. In some instances, the split-screen image modification system 106 determines the second set of pixels from the second portion of the digital image to modify based on the user interaction with the first set of pixels by receiving one or more user interactions across the second set of pixels indicating that the second set of pixels are to be modified based on the user interaction with the first set of pixels. In some cases, the split-screen image modification system 106 further provides, for display within the first panel, a cursor on the first set of pixels from the first portion of the digital image in response to receiving the user interaction with the first set of pixels; and moves the cursor across the first set of pixels within the first panel based on the one or more user interactions across the second set of pixels. Additionally, in some cases, the split-screen image modification system 106 further modifies the digital image by modifying the second set of pixels from the second portion of the digital image by copying, onto the second set of pixels, pixels from the first set of pixels that contact the cursor while moving the cursor across the first set of pixels.

In some implementations, the split-screen image modification system 106 modifies the second set of pixels via cropping. Indeed, in at least one implementation, the split-screen image modification system 106 modifies the second set of pixels from the second portion of the digital image displayed in the second panel based on the user interaction with the first set of pixels by cropping the second set of pixels out of the second portion of the digital image based on the user interaction with the first set of pixels. To provide an illustration, in at least one example, the split-screen image modification system 106 receives the user interaction with the first set of pixels from the first portion of the digital image displayed in the first panel by receiving the user interaction with a cropping indicator, the user interaction indicating a range of pixels to crop out of the first portion of the digital image; and determines the second set of pixels from the second portion of the digital image to modify based on the user interaction with the first set of pixels by determining pixels to crop out of the second portion of the digital image, the pixels corresponding to the range of pixels.

In some embodiments, the series of acts 800 further includes acts for modifying the display of a portion of the digital image within its respective panel. For example, in some implementations, the acts include repositioning the second portion of the digital image within the second panel by panning the second portion of the digital image within the second panel while maintaining a position of the first portion of the digital image within the first panel. In some implementations, the acts include modifying a display of the first portion of the digital image within the first panel by applying a zoom level to the first portion of the digital image while maintaining a current zoom level of the second portion of the digital image within the second panel. In some instances, the acts include modifying a display of the first portion of the digital image within the first panel using a first rotation; and modifying a display of the second portion of the digital image within the second panel using a second rotation that is different than the first rotation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
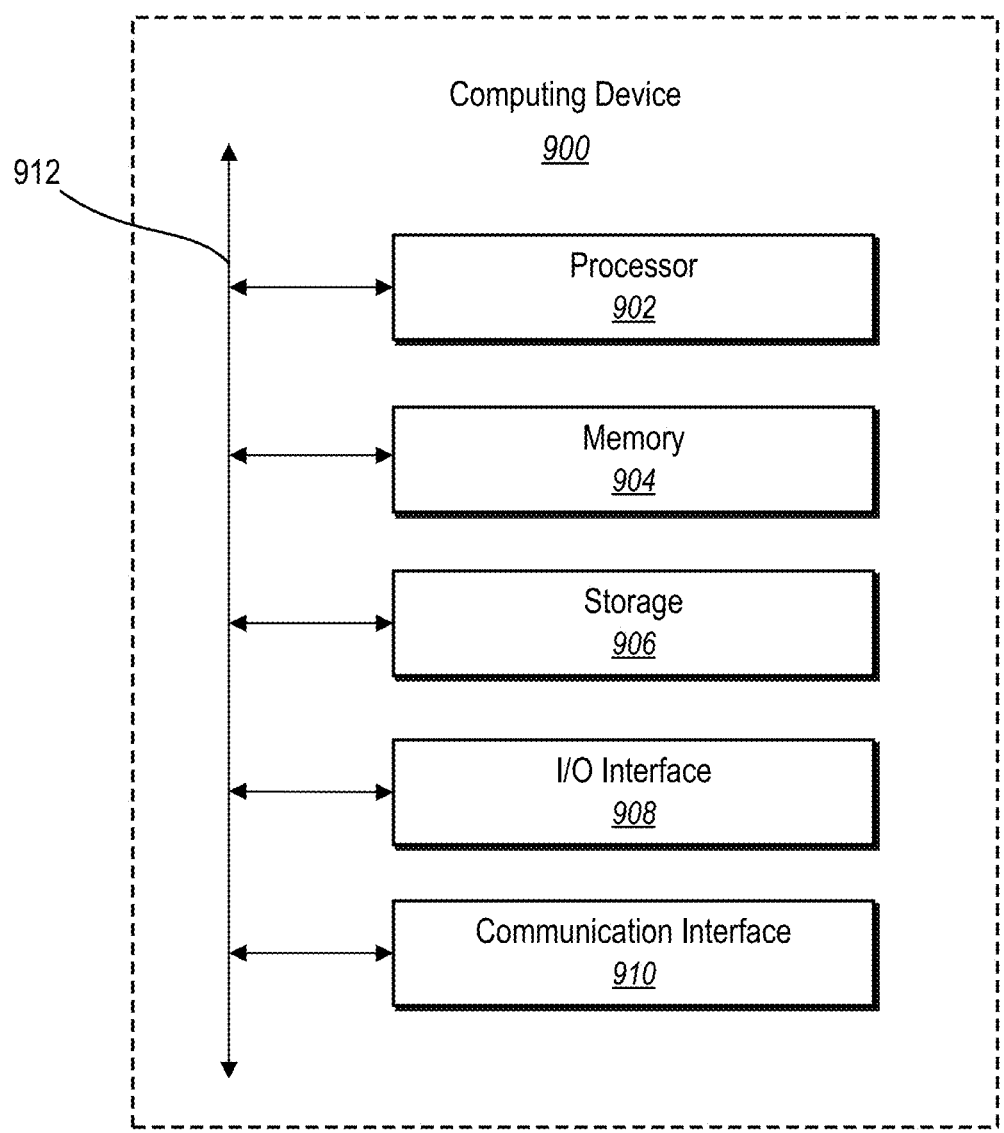
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102 and/or the client devices 110a-110n). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to:

divide a graphical user interface displayed on a client device into a first panel and a second panel;

generate a first matrix having values representing the first panel and a second matrix having values representing the second panel;

provide a first portion of a digital image for display in the first panel and a second portion of the digital image for display in the second panel;

generate a third matrix having values representing the digital image;

determine a first mapping between the first panel and the digital image by determining a first transformation matrix using the first matrix for the first panel and the third matrix for the digital image;

determine a second mapping between the digital image and the second panel by determining a second transformation matrix using the third matrix for the digital image and the second matrix for the second panel;

receive a user interaction with a first set of pixels from the first portion of the digital image displayed in the first panel; and modify a second set of pixels from the second portion of the digital image displayed in the second panel based on the user interaction with the first set of pixels and utilizing the first mapping between the first panel and the digital image and the second mapping between the digital image and the second panel.

2. The non-transitory computer-readable medium of claim 1, wherein the instructions, when executed by the at least one processor, cause the computing device to receive the user interaction with the first set of pixels from the first portion of the digital image displayed in the first panel by receiving the user interaction establishing the first set of pixels as a source location of the digital image comprising pixels to be copied.

3. The non-transitory computer-readable medium of claim 2, further comprising instructions that, when executed by the at least one processor, cause the computing device to receive an additional user interaction with the second set of pixels establishing the second set of pixels as a destination location of the digital image comprising pixels to be copied over, wherein the instructions, when executed by the at least one processor, cause the computing device to modify the second set of pixels from the second portion of the digital image displayed in the second panel based on the user interaction with the first set of pixels by copying the first set of pixels onto the second set of pixels based on the user interaction with the first set of pixels and the additional user interaction with the second set of pixels.

4. The non-transitory computer-readable medium of claim 1, wherein the instructions that, when executed by the at least one processor, cause the computing device to modify the second set of pixels from the second portion of the digital image displayed in the second panel based on the user interaction with the first set of pixels by:

modifying the digital image by modifying the second set of pixels of the second portion of the digital image based on the user interaction with the first set of pixels and the first mapping between the first panel and the digital image; and providing the modified second set of pixels for display in the second panel based on the second mapping between the digital image and the second panel.

5. The non-transitory computer-readable medium of claim 1, wherein the instructions, when executed by the at least one processor, cause the computing device to modify the second set of pixels from the second portion of the digital image displayed in the second panel based on the user interaction with the first set of pixels by cropping the second set of pixels out of the second portion of the digital image based on the user interaction with the first set of pixels.

6. The non-transitory computer-readable medium of claim 1, further comprising instructions that, when executed by the at least one processor, cause the computing device to detect a split-screen trigger, wherein the instructions, when executed by the at least one processor, cause the computing device to divide the graphical user interface displayed on the client device into the first panel and the second panel in response to detecting the split-screen trigger.

7. The non-transitory computer-readable medium of claim 6, wherein the instructions, when executed by the at least one processor, cause the computing device to detect the split-screen trigger by detecting a selection of an image-editing tool via the graphical user interface displayed on the client device.

8. The non-transitory computer-readable medium of claim 1, wherein the instructions, when executed by at least one processor, cause the computing device to:

generate the first matrix having the values representing the first panel by generating the first matrix comprising a first set of values representing at least one of a first panning, a first zoom level, or a first rotation used to display the first portion of the digital image within the first panel; and generate the second matrix having the values representing the second panel by generating the second matrix comprising a second set of values representing at least one of a second panning, a second zoom level, or a second rotation used to display the second portion of the digital image within the second panel.

9. The non-transitory computer-readable medium of claim 1, further comprising instructions that, when executed by the at least one processor, cause the computing device to generate the third matrix having the values representing the digital image by generating the third matrix having a set of values representing locations of pixels of the digital image.

10. A system comprising:

at least one memory device comprising a digital image; and at least one processor configured to cause the system to:
divide a graphical user interface displayed on a client device into a first panel and a second panel;
generate a first matrix having values representing the first panel and a second matrix having values representing the second panel;
provide a first portion of the digital image for display in the first panel and a second portion of the digital image for display in the second panel;
generate a third matrix having values representing the digital image;
determine a first mapping between the first panel and the digital image by determining a first transformation matrix using the first matrix for the first panel and the third matrix for the digital image;
determine a second mapping between the digital image and the second panel by determining a second transformation matrix using the third matrix for the digital image and the second matrix for the second panel;
receive a user interaction with a first set of pixels from the first portion of the digital image displayed in the first panel;
determine a second set of pixels from the second portion of the digital image to modify based on the user interaction with the first set of pixels;
modify the digital image by modifying the second set of pixels from the second portion of the digital image based on the first mapping between the first panel and the digital image; and
provide the modified second set of pixels for display in the second panel based on the second mapping between the digital image and the second panel.

11. The system of claim 10, wherein the at least one processor is configured to cause the system to determine the second set of pixels from the second portion of the digital image to modify based on the user interaction with the first set of pixels by receiving one or more user interactions across the second set of pixels indicating that the second set of pixels are to be modified based on the user interaction with the first set of pixels.

12. The system of claim 11, wherein the at least one processor is further configured to cause the system to:

provide, for display within the first panel, a cursor on the first set of pixels from the first portion of the digital image in response to receiving the user interaction with the first set of pixels; and move the cursor across the first set of pixels within the first panel based on the one or more user interactions across the second set of pixels.

13. The system of claim 12, wherein the at least one processor is further configured to cause the system to modify the digital image by modifying the second set of pixels from the second portion of the digital image by copying, onto the second set of pixels, pixels from the first set of pixels that contact the cursor while moving the cursor across the first set of pixels.

14. The system of claim 10, wherein the at least one processor is further configured to cause the system to modify a display of the first portion of the digital image within the first panel by applying a zoom level to the first portion of the digital image while maintaining a current zoom level of the second portion of the digital image within the second panel.

15. The system of claim 10, wherein the at least one processor is configured to divide the graphical user interface displayed on the client device into the first panel and the second panel in response to detecting selection of an image-editing tool that utilizes at least two points of interest of the digital image for modifying the digital image.

16. The system of claim 10, wherein the at least one processor is configured to cause the system to:
  receive the user interaction with the first set of pixels from the first portion of the digital image displayed in the first panel by receiving the user interaction with a cropping indicator, the user interaction indicating a range of pixels to crop out of the first portion of the digital image; and
  determine the second set of pixels from the second portion of the digital image to modify based on the user interaction with the first set of pixels by determining pixels to crop out of the second portion of the digital image, the pixels corresponding to the range of pixels.

17. The system of claim 10, wherein the at least one processor is configured to cause the system to:
  generate the first matrix having the values representing the first panel by generating the first matrix comprising a first set of values representing at least one of a first panning, a first zoom level, or a first rotation used to display the first portion of the digital image within the first panel; and
  generate the second matrix having the values representing the second panel by generating the second matrix comprising a second set of values representing at least one of a second panning, a second zoom level, or a second rotation used to display the second portion of the digital image within the second panel.

18. In a digital medium environment for editing digital images, a computer-implemented method for performing split-screen editing comprising:
  dividing a graphical user interface displayed on a client device into a first panel and a second panel;
  generating a first matrix having values representing the first panel and a second matrix having values representing the second panel;
  providing a first portion of a digital image for display in the first panel and a second portion of the digital image for display in the second panel;
  generating a third matrix having values representing the digital image;
  determining a first mapping between the first panel and the digital image by determining a first transformation matrix using the first matrix for the first panel and the third matrix for the digital image;
  determining a second mapping between the digital image and the second panel by determining a second transformation matrix using the third matrix for the digital image and the second matrix for the second panel;
  receiving a user interaction with a first set of pixels from the first portion of the digital image displayed in the first panel; and
  modifying a second set of pixels from the second portion of the digital image displayed in the second panel based on the user interaction with the first set of pixels and utilizing the first mapping between the first panel and the digital image and the second mapping between the digital image and the second panel.

19. The computer-implemented method of claim 18, wherein dividing the graphical user interface displayed on the client device into the first panel and the second panel comprises dividing the graphical user interface displayed on a mobile computing device into the first panel and the second panel.

20. The computer-implemented method of claim 18, further comprising:
  modifying a display of the first portion of the digital image within the first panel using a first rotation; and
  modifying a display of the second portion of the digital image within the second panel using a second rotation that is different than the first rotation.

* * * * *